(12) United States Patent
Rickenbach et al.

(10) Patent No.: US 8,851,508 B1
(45) Date of Patent: Oct. 7, 2014

(54) DELAYED VENT IN AIRBAG CURTAIN

(71) Applicant: Autoliv ASP, Inc., Ogden, UT (US)

(72) Inventors: Roger Rickenbach, Farr West, UT (US);
John D. Kemp, Murray, UT (US);
Charles Paul Dinsdale, Farr West, UT (US); Brian Fulmer, Hooper, UT (US);
Abraham Mitchell, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/844,733

(22) Filed: Mar. 15, 2013

(51) Int. Cl.
*B60R 21/233* (2006.01)
*B60R 21/239* (2006.01)
*B60R 21/232* (2011.01)

(52) U.S. Cl.
CPC ............. *B60R 21/239* (2013.01); *B60R 21/233* (2013.01); *B60R 2021/23324* (2013.01); *B60R 21/232* (2013.01)
USPC ........................................ 280/729; 280/730.2

(58) Field of Classification Search
CPC .. B60R 21/232; B60R 21/233; B60R 21/239; B60R 21/261; B60R 21/2346; B60R 2021/23316; B60R 2021/23324
See application file for complete search history.

(56) References Cited

U.S. PATENT DOCUMENTS

| | | | |
|---|---|---|---|
| 5,765,863 A * | 6/1998 | Storey et al. ................... | 280/729 |
| 6,773,027 B2 * | 8/2004 | Bohn et al. ..................... | 280/729 |
| 6,945,556 B2 * | 9/2005 | Maertens ....................... | 280/729 |
| 6,962,364 B2 * | 11/2005 | Ju et al. ........................ | 280/730.2 |
| 7,066,487 B2 * | 6/2006 | Sullivan et al. ................ | 280/729 |
| 7,192,050 B2 * | 3/2007 | Sato et al. ...................... | 280/729 |
| 7,243,941 B2 * | 7/2007 | Charpentier et al. ......... | 280/729 |
| 7,264,269 B2 * | 9/2007 | Gu et al. ...................... | 280/730.2 |
| 7,347,450 B2 * | 3/2008 | Williams et al. .............. | 280/739 |
| 7,398,992 B2 * | 7/2008 | Marriott ........................ | 280/729 |
| 7,568,729 B2 * | 8/2009 | Schnieder et al. ............. | 280/739 |
| 7,607,689 B2 * | 10/2009 | Kalczynski et al. .......... | 280/739 |
| 7,607,690 B2 * | 10/2009 | Abe et al. ....................... | 280/739 |
| 7,762,576 B2 * | 7/2010 | Cho ............................... | 280/729 |
| 7,775,553 B2 * | 8/2010 | Takemura et al. .......... | 280/730.2 |
| 7,900,957 B2 * | 3/2011 | Honda ........................... | 280/729 |
| 8,033,568 B2 * | 10/2011 | Tanaka et al. ................. | 280/729 |
| 8,052,168 B2 * | 11/2011 | Wipasuramonton et al. .......................... | 280/730.2 |
| 8,322,747 B2 * | 12/2012 | Shankar ........................ | 280/729 |
| 8,376,396 B2 * | 2/2013 | Miller et al. .................. | 280/729 |
| 8,550,492 B2 * | 10/2013 | Gwon ........................... | 280/729 |
| 8,608,198 B2 * | 12/2013 | Shibayama et al. .......... | 280/742 |
| 8,708,365 B2 * | 4/2014 | Fulmer et al. ............... | 280/728.2 |
| 8,714,588 B2 * | 5/2014 | Honda et al. ................. | 280/730.2 |
| 8,720,940 B2 * | 5/2014 | Honda et al. ............... | 280/730.2 |

(Continued)

OTHER PUBLICATIONS

PCT International Search Report and Written Opinion for PCT/US2014/014781 filed Feb. 5, 2014, mailed Jun. 2, 2014.

*Primary Examiner* — Ruth Ilan
*Assistant Examiner* — Barry Gooden, Jr.
(74) *Attorney, Agent, or Firm* — Stoel Rives LLP

(57) ABSTRACT

An airbag, or inflatable curtain airbag assembly, can include one or more chambers and vents. The vents can be in fluid communication with one or more of the chambers. The vents can be configured to delay passage of inflation gas from an interior of the airbag into an interior chamber or to an exterior of the airbag upon deployment of the airbag. The vents can also be configured to transition from a closed configuration to an open configuration when an internal pressure of the airbag reaches a predetermined value.

6 Claims, 19 Drawing Sheets

(56) References Cited

U.S. PATENT DOCUMENTS

| | | | |
|---|---|---|---|
| 2002/0175511 A1* | 11/2002 | Dunkle et al. | 280/743.2 |
| 2004/0104561 A1* | 6/2004 | Maertens | 280/730.2 |
| 2004/0169406 A1* | 9/2004 | Yoshida | 297/216.11 |
| 2005/0001415 A1* | 1/2005 | Charpentier et al. | 280/740 |
| 2005/0098985 A1* | 5/2005 | Sullivan et al. | 280/729 |
| 2007/0001433 A1* | 1/2007 | Gu et al. | 280/729 |
| 2007/0138778 A1* | 6/2007 | Takemura et al. | 280/743.1 |
| 2007/0296186 A1* | 12/2007 | Kwon | 280/729 |
| 2009/0020987 A1* | 1/2009 | Wipasuramonton et al. | 280/729 |
| 2009/0218798 A1* | 9/2009 | Garner | 280/742 |
| 2009/0236829 A1* | 9/2009 | Tanaka et al. | 280/728.2 |
| 2010/0052298 A1 | 3/2010 | Schneider et al. | |
| 2010/0133795 A1* | 6/2010 | Fukuda et al. | 280/730.2 |
| 2010/0253055 A1 | 10/2010 | Schneider et al. | |
| 2010/0264630 A1 | 10/2010 | Walston | |
| 2010/0276915 A1* | 11/2010 | Breuninger et al. | 280/729 |
| 2011/0175334 A1* | 7/2011 | Miller et al. | 280/730.2 |
| 2012/0025497 A1* | 2/2012 | Yoo | 280/729 |
| 2012/0299275 A1* | 11/2012 | Saimura et al. | 280/729 |
| 2013/0341894 A1* | 12/2013 | Nakashima et al. | 280/730.2 |

* cited by examiner

DELAYED VENT IN AIRBAG CURTAIN

BACKGROUND

Airbags are often mounted to a vehicle and deploy so as to prevent an occupant from impacting vehicular structures and/or to prevent an occupant from being ejected from a vehicle in a collision. In some instances, the airbags can suffer from one or more drawbacks or may perform less than optimally in one or more respects. Embodiments disclosed herein provide improvement in performance of airbags.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DESCRIPTION

Figure 1A:
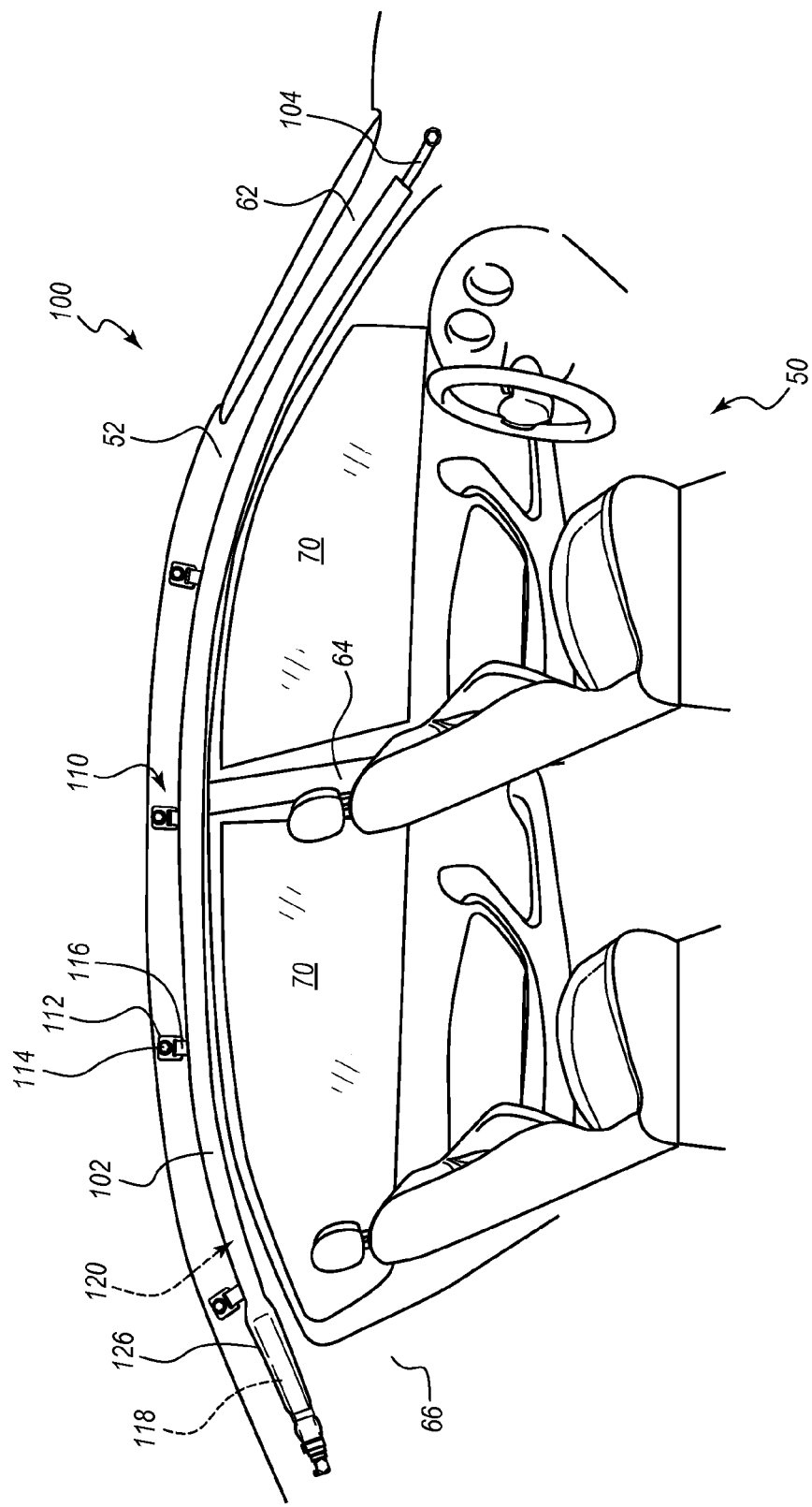
FIG. 1A is an elevation view of an embodiment of an inflatable curtain airbag assembly mounted within a vehicle, wherein the assembly is shown in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag"

generally refers to an inflatable curtain airbag or cushion, although the principles discussed may apply to other airbag types in other embodiments.

Inflatable curtain airbags typically extend longitudinally within the vehicle and are usually coupled to or next to the roof rail of the vehicle. In an undeployed state, inflatable curtain cushions are typically rolled and/or folded, and may be retained in the undeployed configuration by being wrapped in a restraint at various attachment points at which the inflatable airbag is attached to the vehicle, or by being enclosed in a restraint, such as a sleeve or sock. In a deployed state, an inflatable curtain cushion may expand and burst free from the restraint to cover at least a portion of the side windows and one or more pillars of the vehicle. In some embodiments, inflatable curtain cushions may cover one or more of the A-, B-, C-, and D-pillars of a vehicle. For example, in some embodiments, the inflated curtain airbag may extend from the A-pillar to the C-pillar of the vehicle. In other embodiments, a deployed inflatable curtain cushion may extend from the A-pillar to the D-pillar of the vehicle.

In a collision event, the inflatable curtain cushion may be inflated by an inflator and change conformation from being rolled and/or folded in the packaged state to being extended and/or inflated in a deployed state. In some arrangements, the amount of gas from the inflator that is retained within the inflatable curtain determines how hard or soft the cushioning of the curtain will be. Other factors may also affect the cushioning abilities of the inflatable curtain airbag.

Some inflatable curtain cushions may be configured to serve dual functions of cushioning and ejection prevention. During a collision event, the curtain may cushion the head and upper body of an occupant, and during a roll-over event, the cushion may function to help retain the occupant within the vehicle. Inflatable curtain cushions help mitigate the risk of occupant ejection by forming a barrier between the occupant and the side windows.

Some inflatable airbags have a throat portion that is in fluid communication with an inflator. The inflator may be configured to generate inflation gas in response to predetermined conditions. The inflatable airbag may comprise one or more voids or chambers for receiving the inflation gas. The throat liner may be positioned in the void of the inflatable airbag at the throat portion. In some instances the throat liner may extend beyond the throat portion along a longitudinal length of the inflatable airbag. Throat liners of any length and at any position within the void of the throat portion and/or the inflatable airbag are within the scope of this disclosure.

In some embodiments, the throat liner may be made of the same material as the throat portion and the inflatable airbag. In other embodiments, the throat liner may be made of a different material than the throat portion and/or the inflatable cushion. The materials may have different strengths, melting temperatures, and other relevant properties.

In some embodiments, the inflatable curtain airbags disclosed herein may be configured to vent inflation gas in a controlled or delayed manner from one or more chambers or segments of the airbag. Such controlled or delayed venting of the inflatable cushion segments may soften the cushioning provided by the deployed inflatable airbag. Inflatable curtain airbags with varying levels of hardness in different portions or segments of the airbag may be desirable.

Figure 1B:
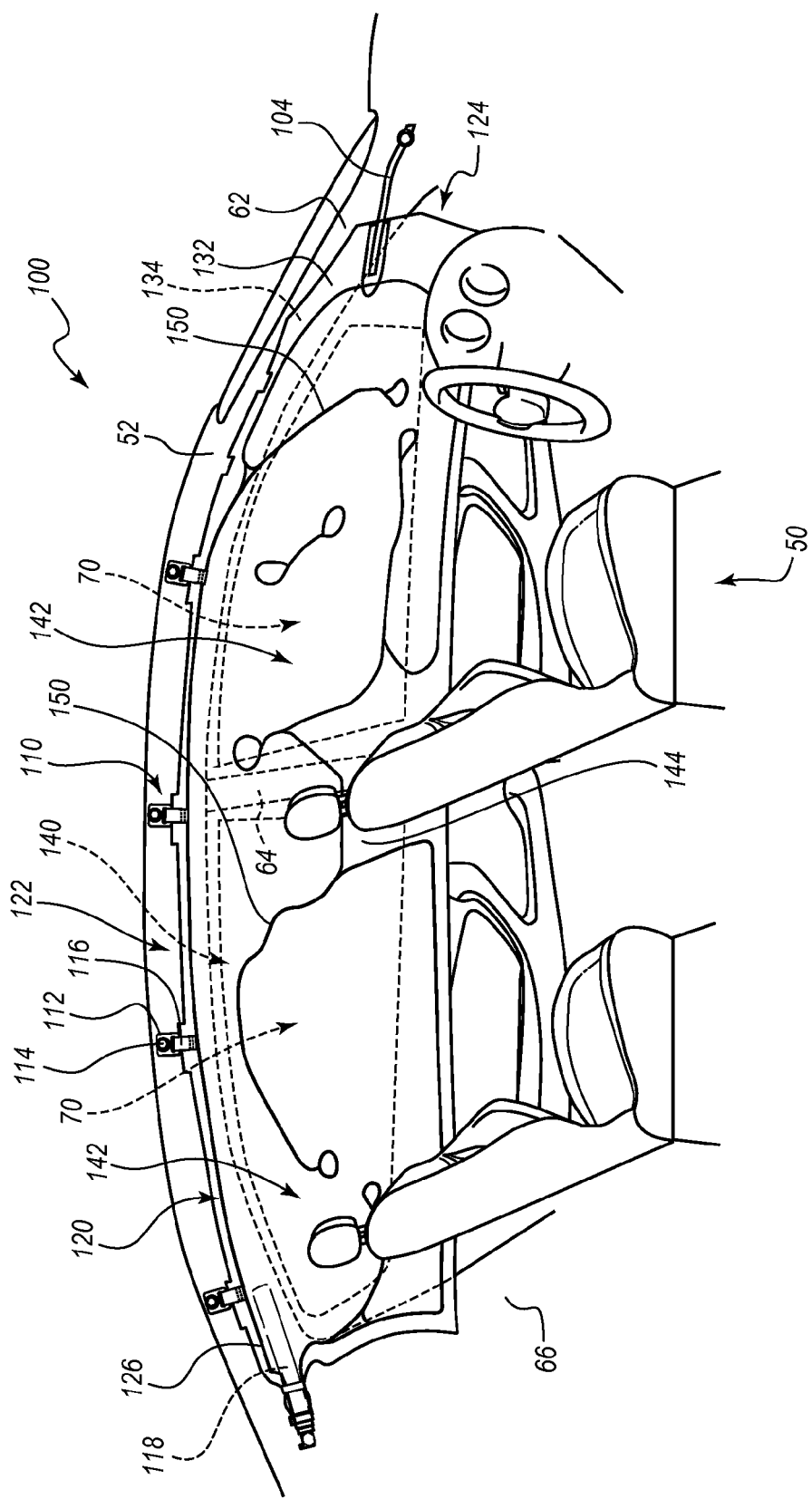
FIG. 1B is another elevation view of the inflatable curtain airbag assembly of FIG. 1A shown in a deployed configuration.

FIGS. 1A and 1B depict an embodiment of an inflatable curtain airbag assembly 100 mounted within a vehicle 50. In FIG. 1A, the assembly 100 is in a packaged configuration, whereas in FIG. 1B, the assembly 100 is in a deployed configuration.

With reference to FIG. 1A, the assembly 100 can include an inflatable curtain airbag 120 (see also FIG. 1B), which can be secured to the vehicle 50 in any suitable manner. The inflatable curtain airbag 120 may also be referred to herein as a cushion or as an airbag. In the illustrated embodiment, the inflatable curtain airbag 120 is positioned at an interior of a restraint 102 so as to be retained in a packaged configuration. The restraint 102 may be of any suitable variety, such as one or more straps, tethers, socks, or sleeves. In the illustrated embodiment, the restraint 102 comprises a sleeve that extends along substantially a full length of the inflatable curtain airbag 120, such that a majority of the inflatable curtain airbag 120 is obscured from view by the sleeve in FIG. 1A.

The assembly 100 can be attached to the vehicle 50 in any suitable manner. For example, in some embodiments, the assembly 100 includes one or more fastening assemblies 110 that are configured to secure one or more of the inflatable curtain airbag 120 and the restraint 102 to the vehicle 50. The assembly 100 can be mounted inside the vehicle 50 adjacent to a roof of the vehicle, such as to a roof rail 52. In the illustrated embodiment, each fastening assembly 110 includes a tether or strap 116 that is secured to mounting hardware, such as a tab 112 that is secured to the roof rail 52 via a fastener 114, such as a bolt. Any other suitable fastening arrangement is contemplated. Each strap 116 may be coupled with one or more of the inflatable curtain airbag 120 and the restraint 102 in any suitable manner.

A forward end of the assembly 100 can include a strap 104, which may be secured to the vehicle in any suitable manner. For example, in the illustrated embodiment, the strap 104 is attached to a lower end of an A-pillar 62. As shown in FIG. 1B, the strap 104 can be attached to a forward end 124 of the inflatable curtain airbag 120. An upper end 122 of the inflatable curtain airbag 120 can be attached to the straps 116. In some embodiments, the straps 116 are sewn to the inflatable curtain airbag 120. In other embodiments, the straps 116 may be integrally formed with the inflatable curtain airbag 120, and may extend from one or more panels of the inflatable cushion 120.

With continued reference to FIG. 1A, the assembly can further include an inflator 118, which may be positioned within a throat 126 of the inflatable curtain airbag 120. The inflator 118 can be anchored to the roof rail 52, and may be of any suitable variety. In some embodiments, the inflator 118 comprises either a pyrotechnic device or a stored gas inflator. The inflator 118 can be in electronic communication with vehicle sensors which are configured to detect vehicle collisions and/or rollovers. Upon detection of predetermined conditions, the sensors can activate the inflator 118 and the inflatable curtain airbag 120 may be rapidly inflated.

With reference to FIGS. 1A and 1B, the inflatable curtain airbag 120 can be configured to cover various structures of the vehicle 50 when deployed. For example, in some embodiments, at least a portion of the deployed inflatable curtain airbag 120 can cover one or more of the A-pillar 62, a B-pillar 64, and a C-pillar 66, and/or one or more side windows 70. The illustrated embodiment is configured to cover the B-pillar 64, and each of the side windows 70.

With reference to FIG. 1B, the inflatable curtain airbag 120 can define various portions that provide different amounts of cushioning relative to the vehicle structures. In particular, the inflatable curtain airbag 120 can include various inflatable chambers, cells, or cushion segments that are configured to be filled with inflation gases in order to cushion a vehicle occupant during a collision event. The inflatable cushion segments 142 can be configured to deploy at strategic areas at which a vehicle occupant may benefit most from the cushioning. The illustrated embodiment includes a plurality of inflatable cushion segments 142 that are in fluid communication with an inflation gas delivery channel 140. In some embodiments, inflation gases may be retained within a given inflatable cushion segment 142 to maintain the inflatable cushion segment 142 in an inflated or filled configuration, even when a vehicle occupant presses against the inflatable cushion segment 142. Such an arrangement can allow the inflatable cushion segment 142 to provide a desired amount of protection to the vehicle occupant.

In some embodiments, the inflatable curtain airbag 120 can include one or more non-inflatable regions 144, one or more of which may be positioned between adjacent inflatable cushion segments 142 or at an interior of an inflatable cushion segment 142 (e.g., so as to be encompassed by an inflatable cushion segment 142).

In various embodiments, at least a portion of one or more of the inflatable cushion segments 142 and the non-inflatable regions 144 can be defined by one or more boundary seams 150. The one or more boundary seams 150 may be formed in any suitable manner. For example, in some embodiments, the one or more boundary seams 150 may comprise one or more of stitches, welds (e.g., radiofrequency welds), and/or adhesives. In other or further embodiments, the boundary seams 150 may be woven portions that are formed via one-piece weaving techniques. As further discussed below, in some embodiments, the boundary seams 150 may join together two or more pieces of fabric, such as a front face 132 and a rear face 134. In some embodiments, the one or more boundary seams 150 are substantially airtight so as to be able to retain inflation gas within a given inflatable cushion segment 142. The one or more boundary seams 150 can be said to fluidly isolate adjacent inflatable cushion segments 142 from each other. In other embodiments, the one or more boundary seams 150 may not be airtight, but may instead resist egress of gases from an inflatable cushion segment 142.

The shapes of the inflatable curtain airbag 120 and its various components, such as the segments 142, that are depicted in FIG. 1B are not necessarily limiting. These shapes may be altered, such as to accommodate differently shaped vehicles. In some embodiments, the inflated inflatable curtain airbag 120 is configured to fit within the side window wells of vehicle 50. The inflatable curtain airbag 120 may comprise a contiguous piece of material manufactured using a one-piece woven technique, in some embodiments, or in other or further embodiments, may be manufactured by cutting and sewing separate pieces of material (e.g., nylon fabric) together. For example, the front and rear faces 132, 134 may be formed from separate sheets of material that are joined together. In other embodiments, the front and rear faces 132, 134 may be formed from a unitary piece of material.

As can be appreciated from FIGS. 1A and 1B, when the inflatable curtain airbag 120 is in the packaged configuration, all components of the inflatable curtain airbag 120 can be at an interior of the restraint 102. In the illustrated embodiment, the restraint 102 is a sleeve that covers an entirety of the inflatable curtain airbag 120. However, in other embodiments, the restraint 102 may merely comprise a plurality of straps, and each strap may encompass a portion of various components of the inflatable curtain airbag 120, such as, for example, portions of the inflation gas delivery channel 140.

Figure 2:
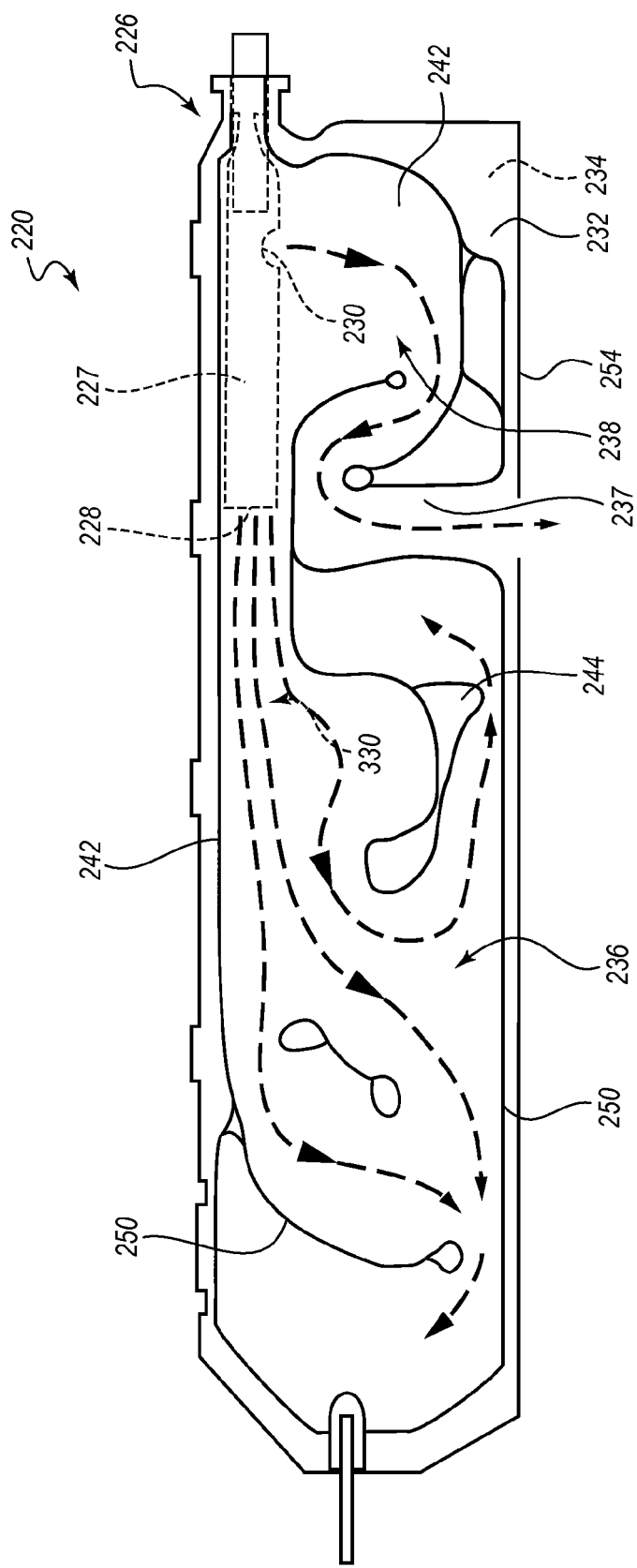
FIG. 2 is an elevation view of an embodiment of an inflatable curtain airbag that is compatible with the inflatable curtain airbag assembly of FIGS. 1A and 1B.

FIG. 2 depicts another embodiment of an inflatable curtain airbag 220 that can resemble the inflatable curtain airbag 120 described above in certain respects, and that can be compatible with the assembly 100. Accordingly, like features are designated with like reference numerals, with the leading digits incremented to "2." Relevant disclosure set forth above regarding similarly identified features thus may not be repeated hereafter. Moreover, specific features of the inflatable curtain airbag 220 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant description of such features applies equally to the features of the inflatable curtain airbag 220. Any suitable combination of the features and variation of the same described with respect to the inflatable curtain airbag 120 can be employed with the inflatable curtain airbag 220, and vice versa. This pattern of disclosure applies equally to further embodiments depicted in subsequent figures and described hereafter, wherein the leading digits may be further incremented.

Referring to FIG. 2, the inflatable curtain airbag 220 has a longitudinal orientation and includes a throat portion 226 at a proximal end. As used herein, the terms proximal and distal refer to proximity to the inflator 118 and/or direction of inflation gas flow during deployment, where more proximally oriented features are closer to the inflator 118 and/or contact inflation gases sooner than do more distally oriented features. The throat portion 226 may be configured to receive at least a portion of an inflator 118 therein and/or to be coupled with the inflator 118. As illustrated, the inflatable curtain airbag 220 includes a front face 232 and a rear face 234 that meet at an edge 254. The front face 232 and the rear face 234 cooperate to define a void or chamber for receiving an inflation gas from the inflator 118. In the illustrated embodiment, the inflatable curtain airbag 220 further comprises a boundary seam 250 adjacent to the edge 254 of the inflatable curtain airbag 220. The boundary seam 250 also defines the one or more inflatable cushion segments 242 and non-inflatable regions 244. In the illustrated embodiment, the inflatable cushions segments 242 are in fluid communication with each other. In some embodiments, the inflatable cushion segments 242 may not be in fluid communication with one another, and in other embodiments, only a portion of a total number of inflatable cushion segments 242 may be in fluid communication with one another. The one or more boundary seams 250 may fluidly seal the void of the inflatable cushion 220. In yet other embodiments, the one or more boundary seams 250 may not be airtight but may instead resist egress of gasses from the void of the inflatable cushion 220.

As illustrated, the inflatable curtain airbag 220 further includes a throat liner 227 in fluid communication with and disposed within at least a portion of the throat portion 226. In some embodiments, the throat liner 227 may comprise an aperture for passage of the inflation gas into the inflatable curtain airbag 220. In other embodiments, the throat liner 227 may comprise two panels that cooperate to form the aperture for passage of the inflation gas into the inflatable curtain airbag 220. In yet other embodiments, the throat liner 227 may be formed from a unitary piece of material. For example, the throat liner 227 may be woven by a one-piece woven technique.

The throat liner 227 may also be configured to receive at least a portion of the inflator 118 therein and/or to be coupled with the inflator 118. In the illustrated embodiment, the throat liner 227 comprises an opening 228 at a position distal to the inflator 118 and a vent 230 spaced along a longitudinal length of the throat liner 227. In some embodiments, the throat liner 227 can comprise one or more vents 230 spaced along the longitudinal length of the throat liner 227. The one or more vents 230 and/or openings 228 can be configured to selectively distribute the inflation gas into various portions and/or segments of the inflatable curtain airbag 220. In the illustrated embodiment, the throat liner 227 extends in the longitudinal orientation of the inflatable curtain airbag 220 distally from the throat portion 226. Throat liners 227, however, of various lengths and disposed at various positions within the inflatable curtain airbag 220 are also within the scope of this disclosure.

Referring again to FIG. 2, the inflatable curtain airbag 220 comprises two chambers, a first chamber 236 and a second chamber 238, wherein a volume of the first chamber 236 is greater than a volume of the second chamber 238. As shown, the first chamber 236 extends in a longitudinal orientation along about two-thirds of a length of the inflatable curtain airbag 220 and the second chamber 238 extends in a longitudinal orientation along about one-third of the length of the inflatable curtain airbag 220. In some embodiments, the relative volumes and/or lengths of the first and second chambers 236, 238 may be different than depicted in the illustrated embodiment. The second chamber 238 may be positioned at or adjacent to a C-pillar 66 of a vehicle 50. Alternatively, the second chamber 238 may be positioned rearward to a B-pillar 64 of a vehicle 50. Each of the first and second chambers 236, 238 comprise at least one inflatable cushion segment 242. Additionally, both of the first and second chambers 236, 238 are in fluid communication with the throat liner 227. In some embodiments, the first and second chambers 236, 238 may be in fluid communication with each other and with other components of the inflatable curtain airbag 220. For example, the first and second chambers 236, 238 may be coupled to the throat portion 226 in embodiments that lack a throat liner 227. As illustrated, the first chamber 236 comprises three inflatable cushion segments 242, and the second chamber 238 comprises one inflatable cushion segment 242. In some embodiments, the first chamber 236 may comprise more or less than three inflatable cushion segments 242. Likewise, the second chamber 238 may comprise more or less than one inflatable cushion segment 242. The configuration, number, and/or positioning of the inflatable cushion segments 242 can be designed so as to provide the inflatable curtain airbag 220 with desired protective and cushioning characteristics.

As illustrated, the second chamber 238 further comprises a substantially U-shaped tortuous vent 237, wherein the tortuous vent 237 is in fluid communication with an exterior of the inflatable curtain airbag 220. The tortuous vent 237 is also in fluid communication with the inflatable cushion segment 242 of the second chamber 238. The tortuous vent 237 may comprise a plurality of loops and/or turns. In other embodiments, the tortuous vent 237 may be substantially C-shaped, S-shaped, circuitous, or otherwise shaped. The shape of the tortuous vent may be configured to delay venting of the inflation gas from the void of the inflatable curtain airbag 220.

The dashed arrows in FIG. 2 depict possible paths of the inflation gas as the inflation gas enters the inflatable curtain airbag 220 during deployment. A first portion of the inflatable gas may enter the first chamber 236 and second portion of the inflation gas may enter the second chamber 238. In the illustrated embodiment, the first portion of the inflation gas comprises a greater volume than the second portion of the inflation gas. As the inflation gas inflates the inflatable cushion segments 242 the volume of the inflation gas in the inflatable curtain airbag 220 may reach a predetermined value. In some embodiments, the predetermined value may be reached when the volume of inflation gas in at least one of the first and second chambers 236, 238 reaches a specified level. When the volume of the inflation gas reaches the predetermined value, the tortuous vent 237 may be configured to permit or allow passage of inflation gas through at least a portion of a length of the tortuous vent 237. In some embodiments, the predetermined value may be set to be reached when an occupant strikes the second chamber 238 in a collision event.

The tortuous vent 237 may also be configured such that approximately when the one or more inflatable cushion segments 242 of the second chamber 238 are fully inflated, the inflation gas may begin to egress from a distal end of the tortuous vent 237, and the inflation gas may begin to further egress to an exterior of the inflatable curtain airbag 220. The inflatable curtain airbag 220 and/or the tortuous vent 237 may also be configured such that the inflation gas may exit the tortuous vent 237 at other desired time points.

Figure 3:
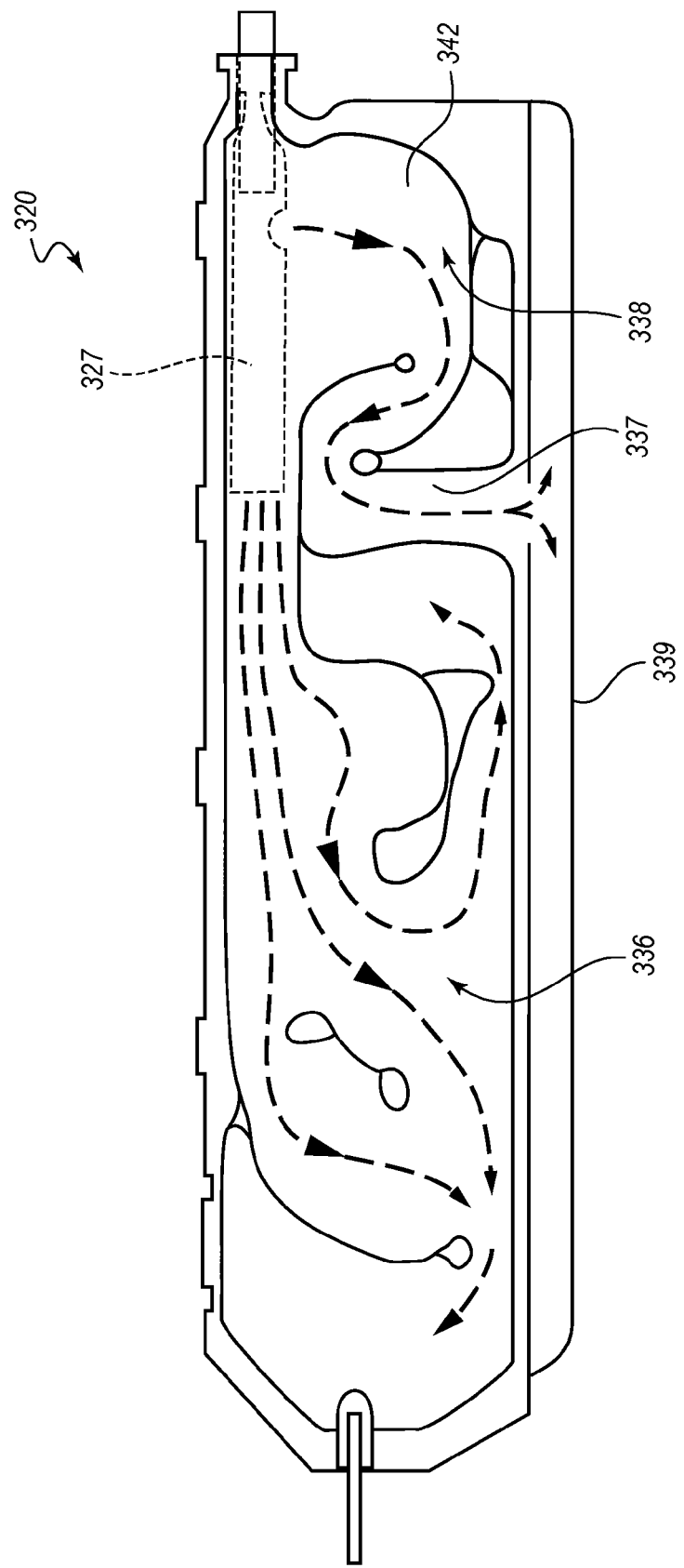
FIG. 3 is an elevation view of another embodiment of an inflatable curtain airbag that is compatible with the inflatable curtain airbag assembly of FIGS. 1A and 1B.

FIG. 3 depicts another embodiment of an inflatable curtain airbag 320 such as the inflatable curtain airbag 220 discussed above. Embodiments of the inflatable curtain airbag 320 are compatible with embodiments of the assembly 100 discussed above. As shown in FIG. 3, inflatable curtain airbag 320 comprises a first chamber 336 and a second chamber 338. The second chamber 338 comprises an inflatable cushion segment 342 in fluid communication with both of a throat liner 327 and a tortuous vent 337. As illustrated, the tortuous vent 337 is in fluid communication with a third chamber 339. Thus, tortuous vent 337 can vent inflation gas internally into the third chamber 339. In this embodiment, the inflation gas may not egress to the exterior of the inflatable cushion segment 320. Embodiments of the inflatable curtain airbags 320 may be desirable in vehicles where it is advantageous to contain the inflation gas within the inflatable curtain airbag 320.

Figure 4:
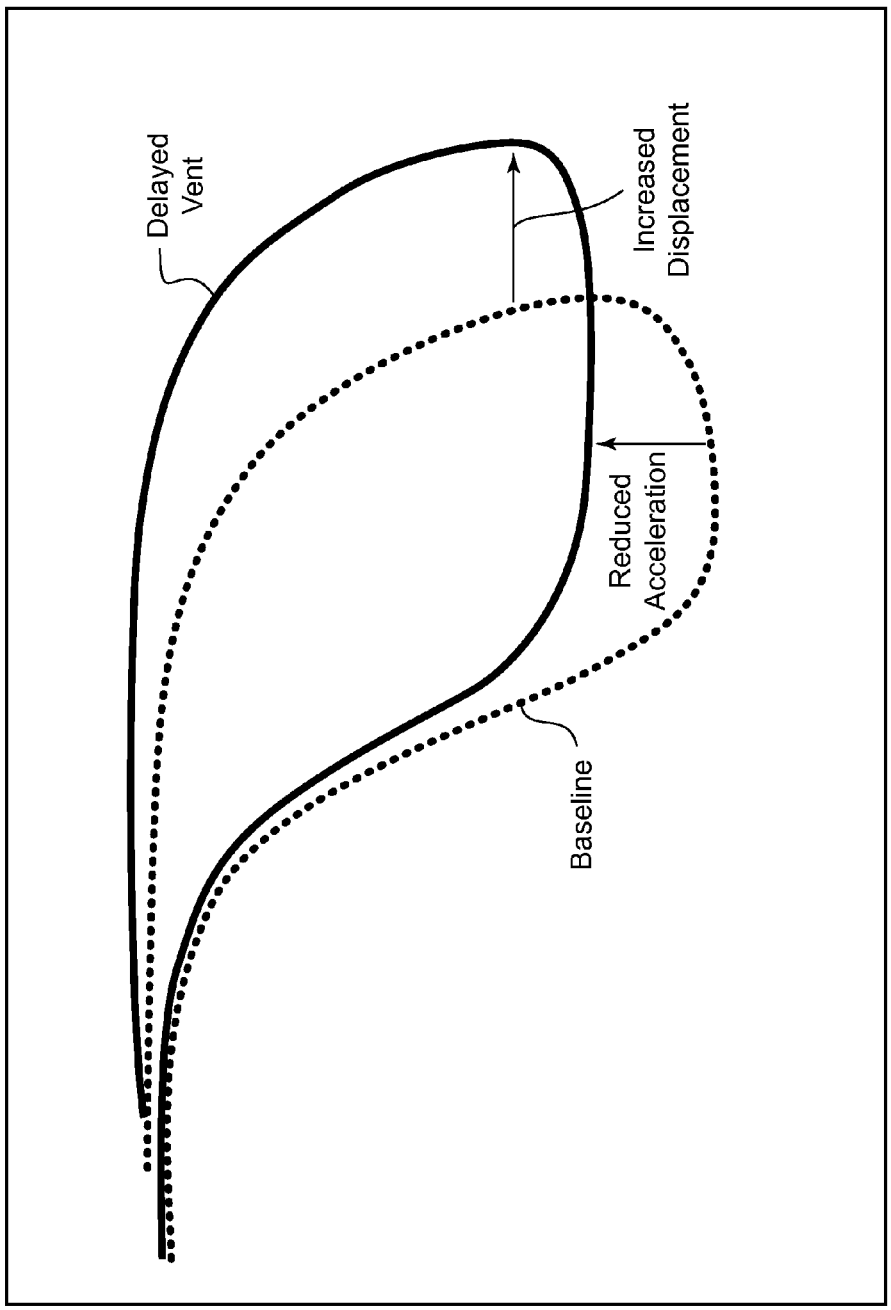
FIG. 4 is a graph comparing values of occupant acceleration and occupant displacement into an airbag.

FIG. 4 is a graph comparing values of vehicle occupant acceleration and vehicle occupant displacement into an airbag. The graph compares these values in two embodiments, including a baseline airbag embodiment and a delayed vent airbag embodiment. The dotted line depicts values associated with the baseline airbag embodiment, which is a sealed airbag that does not comprise a vent. The solid line depicts values associated with the delayed vent airbag embodiment, which is an airbag with a delayed vent (e.g., such as tortuous vent 237) as disclosed herein. The baseline airbag may be stiffer, when fully deployed, than an airbag comprising a vent. As depicted in FIG. 3, the baseline airbag has a higher magnitude of acceleration than the delayed vent airbag. Further, the delayed vent may reduce the magnitude of acceleration of the delayed vent airbag as compared to the baseline airbag, and a delayed vent may also increase the magnitude of occupant displacement into the airbag as compared to the baseline airbag. Such changes in magnitude may result in improved cushioning abilities of the airbag.

Figure 5A:
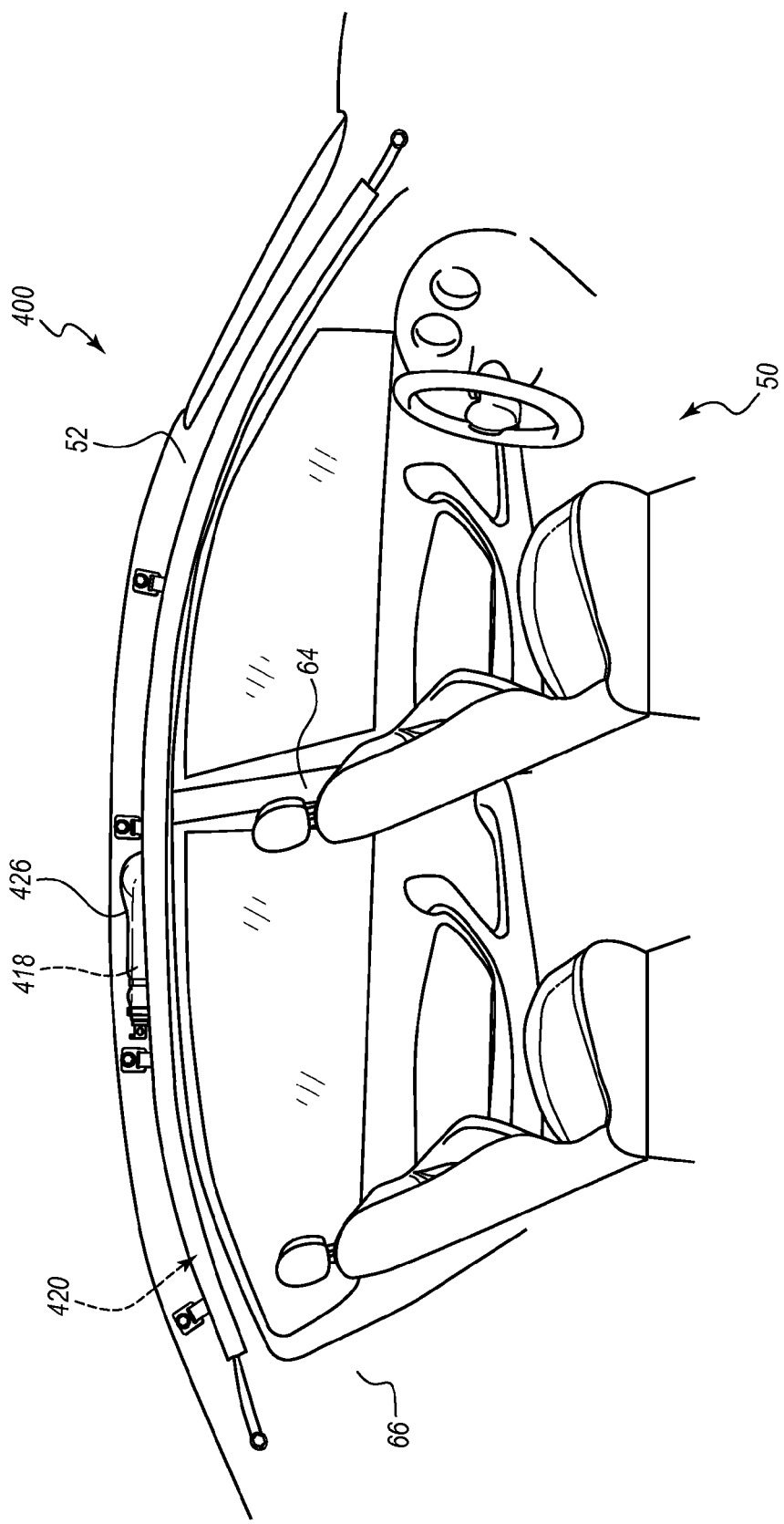
FIG. 5A is an elevation view of another embodiment of an inflatable curtain airbag assembly mounted within a vehicle, wherein the assembly is shown in a packaged configuration.
Figure 5B:
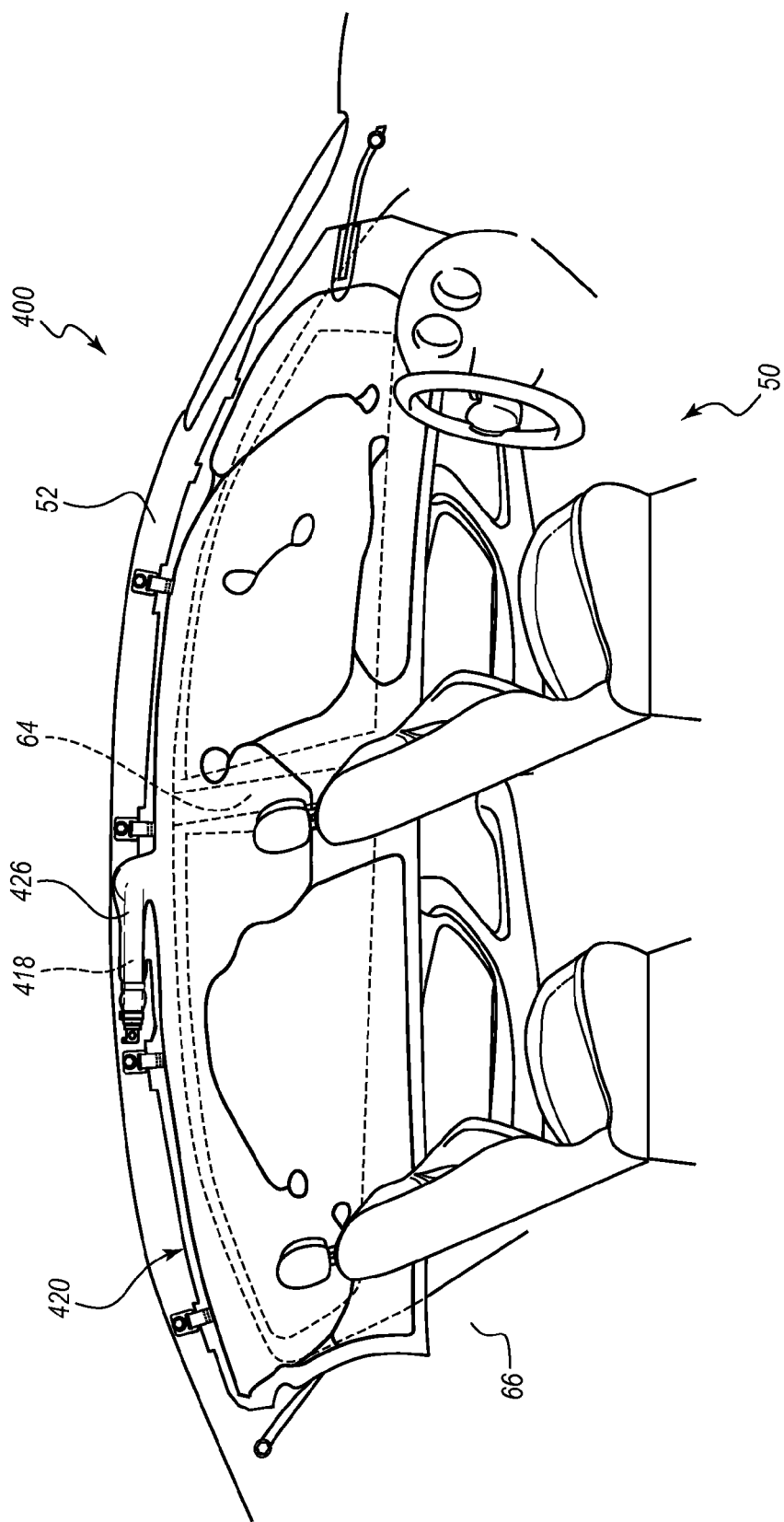
FIG. 5B is another elevation view of the inflatable curtain airbag assembly of FIG. 5A shown in a deployed configuration.

FIGS. 5A and 5B depict another embodiment of an inflatable curtain airbag assembly 400 mounted within a vehicle 50 such as the inflatable curtain airbag assembly 100 discussed above. In FIG. 5A, the assembly 400 is in a packaged configuration, whereas in FIG. 5B, the assembly 400 is in a deployed configuration.

The assembly 400 can further include an inflator 418, which may be positioned within a throat portion 426 of the inflatable curtain airbag 420. The inflator 418 can be anchored to the roof rail 52, and may be of any suitable variety. Whereas the inflator 118 is anchored to the vehicle 50 adjacent to the C-pillar 66 forming an "end-fill" configuration, the inflator 418 is anchored to the vehicle 50 rearward of the B-pillar 64 forming a "mid-fill" configuration. As described for inflator 118, upon detection of predetermined conditions, vehicle sensors can activate the inflator 418 and the inflatable curtain airbag 420 may be rapidly inflated.

Figure 6:
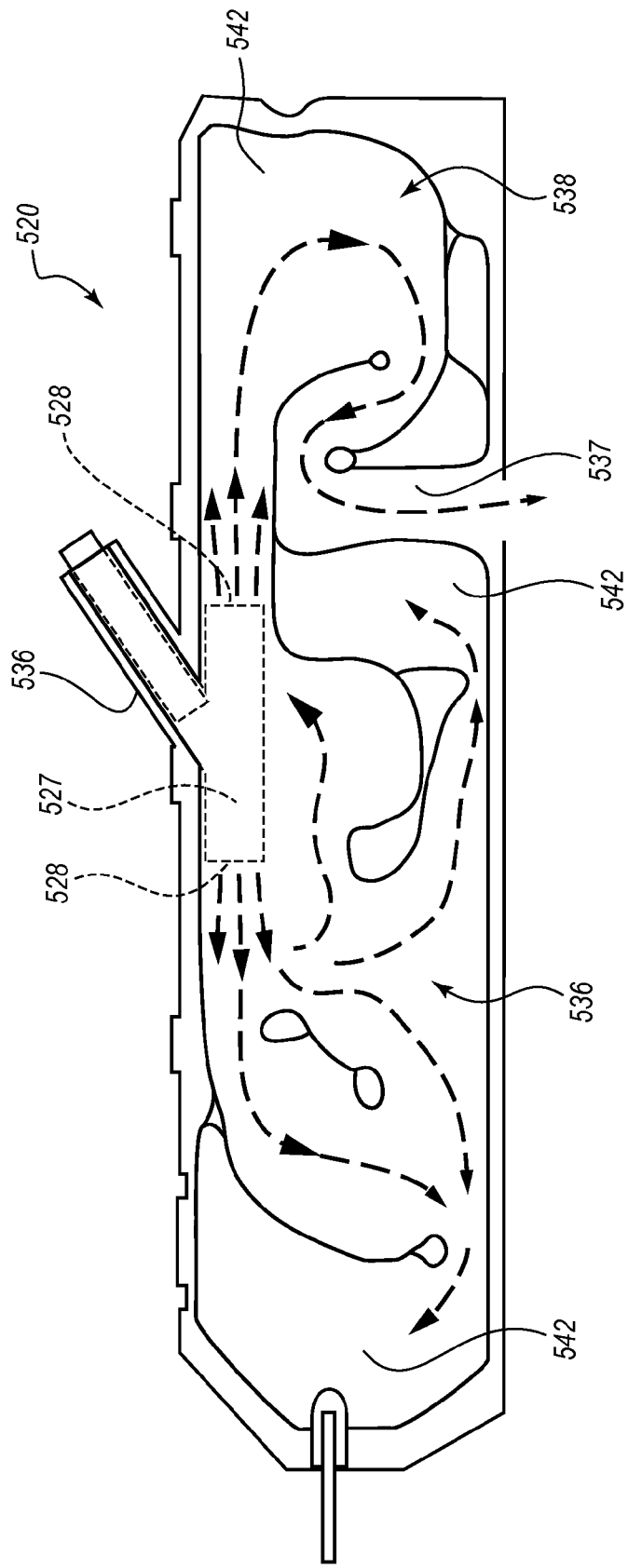
FIG. 6 is an elevation view of an embodiment of an inflatable curtain airbag that is compatible with the inflatable curtain airbag assembly of FIGS. 5A and 5B.
Figure 7:
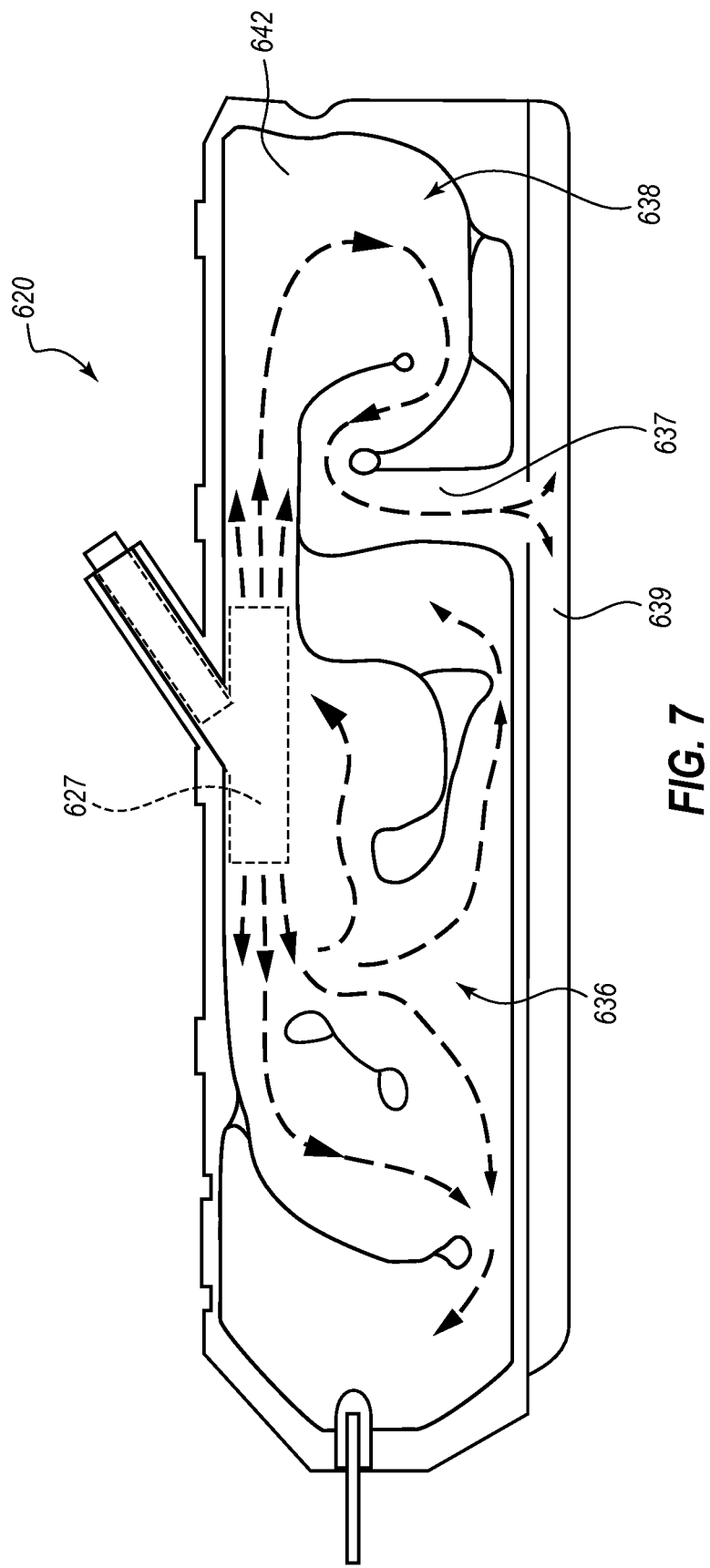
FIG. 7 is an elevation view of another embodiment of an inflatable curtain airbag that is compatible with the inflatable curtain airbag assembly of FIGS. 5A and 5B.

FIGS. 6 and 7 depict two additional embodiments of inflatable curtain airbags 520, 620 that can resemble the inflatable curtain airbags 220, 320 described above in certain respects. Inflatable curtain airbags 520, 620 are compatible with the assembly 400.

Referring to FIG. 6, the inflatable curtain airbag 520 has a longitudinal orientation and includes a throat portion 526 at a middle portion of the inflatable curtain airbag 520. The inflatable curtain airbag 520 includes a throat liner 527 in fluid communication with and disposed within at least a portion of the throat portion 526. In the illustrated embodiment, the throat liner 527 comprises two openings 528 at positions distal to the inflator 418. As shown, the throat liner 527 extends in the longitudinal orientation of the inflatable curtain airbag 520 distally from the throat portion 526.

As in inflatable curtain airbags 220, 320, inflatable curtain airbag 520 comprises two chambers, a first chamber 536 and a second chamber 538. As illustrated, the second chamber 538 further comprises a substantially U-shaped tortuous vent 537, wherein the tortuous vent 537 is in fluid communication with an exterior of the inflatable curtain airbag 520. The tortuous vent 537 is also in fluid communication with the inflatable cushion segment 542 of the second chamber 538.

The dashed arrows in FIG. 6 depict possible paths of the inflation gas as the inflation gas enters the inflatable curtain airbag 520 during deployment. A first portion of the inflatable gas may enter the first chamber 536 and second portion of the inflation gas may enter the second chamber 538. In the illustrated embodiment, the first portion of the inflation gas comprises a greater volume than the second portion of the inflation gas. As the inflation gas inflates the plurality of inflatable cushion segments 542 the volume of the inflation gas in the second chamber 538 may reach a predetermined value. When the volume of the inflation gas reaches the predetermined value, the tortuous vent 537 may be configured to permit or allow passage of the inflation gas through at least a portion of a length of the tortuous vent 537.

Referring to FIG. 7, inflatable curtain airbag 620 also comprises a first chamber 636 and a second chamber 638. The second chamber 638 comprises an inflatable cushion segment 642 in fluid communication with both of a throat liner 627 and a tortuous vent 637. As illustrated, the tortuous vent 637 is in fluid communication with a third chamber 639. Thus, tortuous vent 637 can vent inflation gas internally into the third chamber 639. In this embodiment, the inflation gas may not egress to the exterior of the inflatable cushion segment 620, rather the inflatable gas egresses into a void of the third chamber 639.

Another embodiment of an inflatable curtain airbag 720 such as the inflatable curtain airbags 220, 320 discussed above, is depicted in FIG. 8. Embodiments of the inflatable curtain airbag 720 are compatible with embodiments of the assembly 100 discussed above. The inflatable curtain airbag 720 has a longitudinal orientation and includes a throat portion 726 at a proximal end. The throat portion 726 may be configured to receive at least a portion of an inflator 118 therein and/or to be coupled with the inflator 118. As depicted, inflatable curtain airbag 720 also comprises a throat liner 727 in fluid communication with and disposed within at least a portion of the throat portion 726. Further, the throat liner 727 extends in the longitudinal orientation of the inflatable curtain assembly 720 distally from the throat portion 726. As described above, other throat liner 727 configurations are also contemplated.

Figure 8:
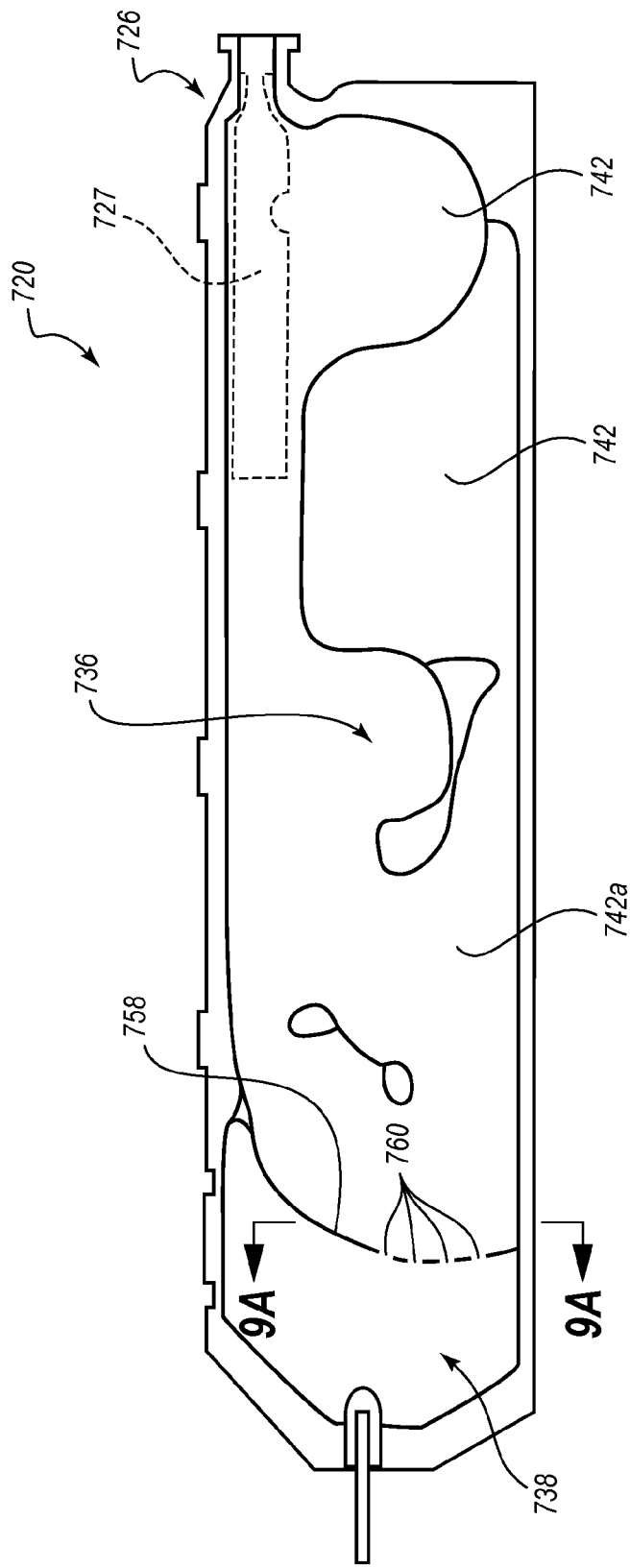
FIG. 8 is an elevation view of another embodiment of an inflatable curtain airbag that is compatible with the inflatable curtain airbag assembly of FIGS. 1A and 1B.

FIG. 8 depicts an inflatable curtain airbag 720 including a first chamber 736 and a second chamber 738 wherein a volume of the first chamber is greater than a volume of the second chamber 738. As described above, however, other configurations of the first and second chambers 736, 738 are contemplated. The first chamber 736 can comprise a plurality of inflatable cushion segments 742 that are in fluid communication with the throat liner 727. The second chamber 738 can be configured to receive inflation gas from one or more of the inflatable cushion segments 742. In some embodiments, the second chamber 738 can aid in controlling or maintaining an internal pressure of the inflatable curtain airbag 720. For example, one or more second chambers 738 may aid in maintaining the internal pressure below a predetermined value. In the illustrated embodiment, the second chamber 738 is isolated from each of the inflatable cushion segments 742, the throat liner 727, the throat portion 726, and the inflator 118 by a venting panel 758. Further, the inflatable curtain airbag 720 comprises one second chamber 738 distally disposed in the inflatable curtain airbag 720 relative to each of the venting panel 758, the inflatable cushion segments 742, and the throat portion 726. The inflatable curtain airbag 720, as illustrated, comprises one venting panel 758 extending in a substantially transverse direction relative to the longitudinal orientation of the inflatable curtain airbag 720.

In other embodiments, there may be more than one second chamber 738 and/or more than one venting panel 758. In embodiments, the one or more venting panels 758 may define a boundary of one or more of the inflatable cushion segments 742. The one or more second chambers 738 and/or venting panels 758 may also be disposed at any suitable position in the inflatable curtain airbag 720, as described more fully below in other embodiments.

Figure 9A:
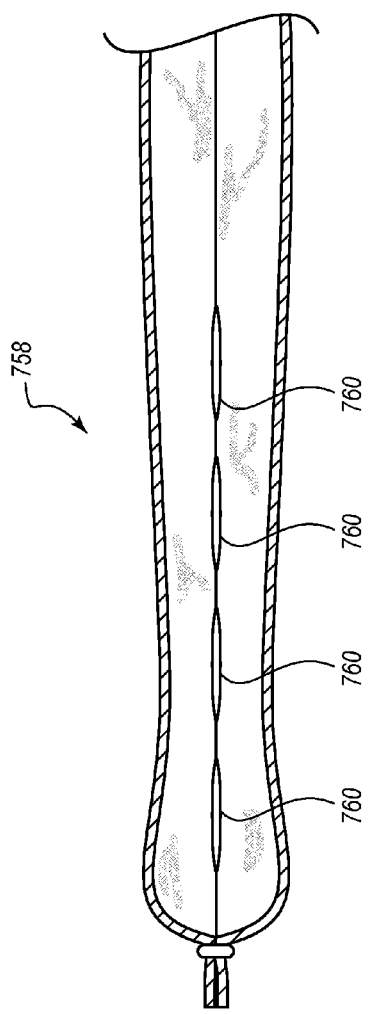
FIG. 9A is an enlarged cross-sectional view of the inflatable curtain airbag of FIG. 8 taken along line 9A-9A depicting an embodiment of a venting panel in a closed configuration.
Figure 9B:
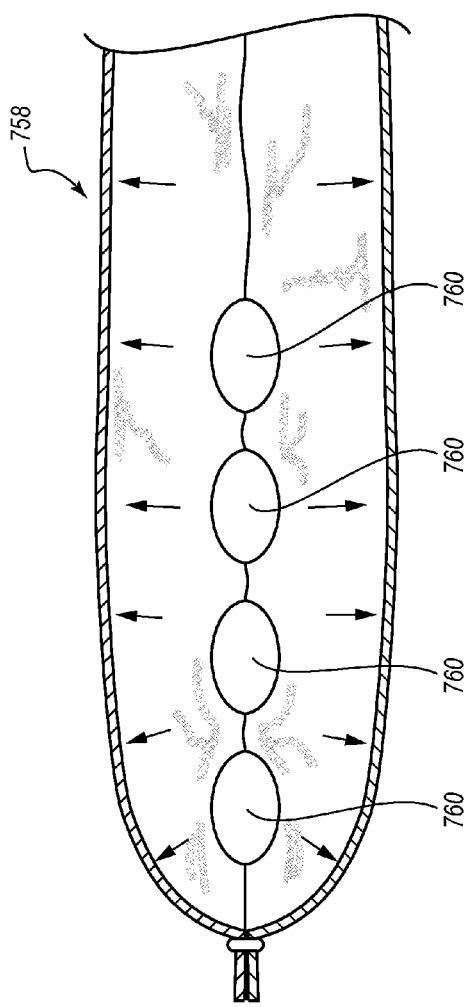
FIG. 9B is an enlarged cross-sectional view of the inflatable curtain airbag of FIG. 8 taken along line 9A-9A depicting the embodiment of the venting panel of FIG. 9A in an open configuration.

In the illustrated embodiment, the venting panel 758 comprises a plurality of slits 760 or openings. FIGS. 9A and 9B are enlarged cross-sectional views of the inflatable curtain airbag of FIG. 8 taken along line 9A-9A depicting an embodiment of a venting panel 758. The venting panel 758 of FIG. 9A is in a closed configuration and the venting panel 758 of FIG. 9A in an open configuration. The slits 760 can be configured to transition from a closed configuration (as in FIG. 9A) to an open configuration (as in FIG. 9B) when a volume of inflation gas in the first chamber 736 reaches a predetermined value. In other embodiments, the slits 760 can be configured to transition from a closed configuration to an open configuration when an interior pressure of the first chamber 736 reaches a predetermined value. The size and/or the shape of the slits can be designed such that the slits transition from a closed configuration to an open configuration when the pressure differential across the slits reaches a predetermined value. For example, slits with smaller dimensions may require a greater pressure differential across the slits to transition the slits from a closed configuration to an open configuration than may be required for slits with larger dimensions. In another embodiment, the predetermined value may be reached when a vehicle occupant strikes a deployed inflatable curtain airbag 720 during a collision event.

Referring again to FIG. 8, in some embodiments, the venting panel 758 may define the boundary between the second chamber 738 and inflatable cushion segment 742a, and inflatable cushion segment 742a may be configured to deflate more quickly than the remaining inflatable cushion segments 742 of the first chamber 736. Additionally, the venting panel 758 may prevent the inflation gas from moving from the inflatable cushion segments into the second chamber 738 when the slits 760 are in a closed configuration. Also, the venting panel 758 may permit the inflation gas to move more easily from the inflatable cushion segments 742 into the second chamber 738 when the slits 760 are in an open configuration.

Figure 10:
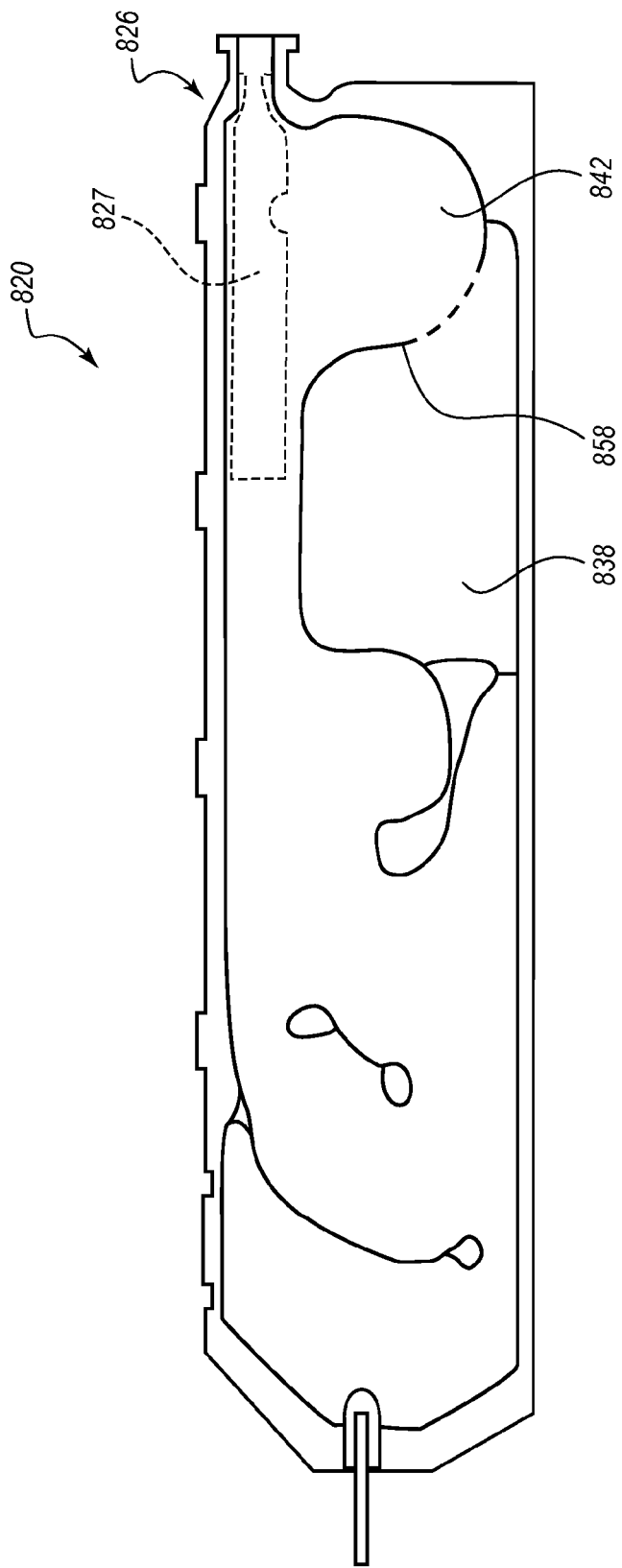
FIG. 10 is an elevation view of another embodiment of an inflatable curtain airbag that is compatible with the inflatable curtain airbag assembly of FIGS. 1A and 1B.

FIG. 10 depicts another embodiment of an inflatable curtain airbag 820 such as the inflatable curtain airbag 720 discussed above. Embodiments of the inflatable curtain airbag 820 are compatible with embodiments of assembly 100 discussed above. A first inflatable cushion segment 842 of the inflatable curtain airbag 820 is positioned proximally to the throat portion 826 and below the throat liner 827. A second chamber 838 is positioned distally to the first inflatable cushion segment 842. The venting panel 858 defines a boundary between the first inflatable cushion segment 842 and the second chamber 838. In other embodiments, venting panels 858 may be positioned in any suitable location in the inflatable curtain airbag 820, as further discussed below. Placement of the second chamber 838 and/or the venting panel 858 can be made to impart desirable cushioning and venting characteristics to the inflatable curtain airbag 820.

Figure 11:
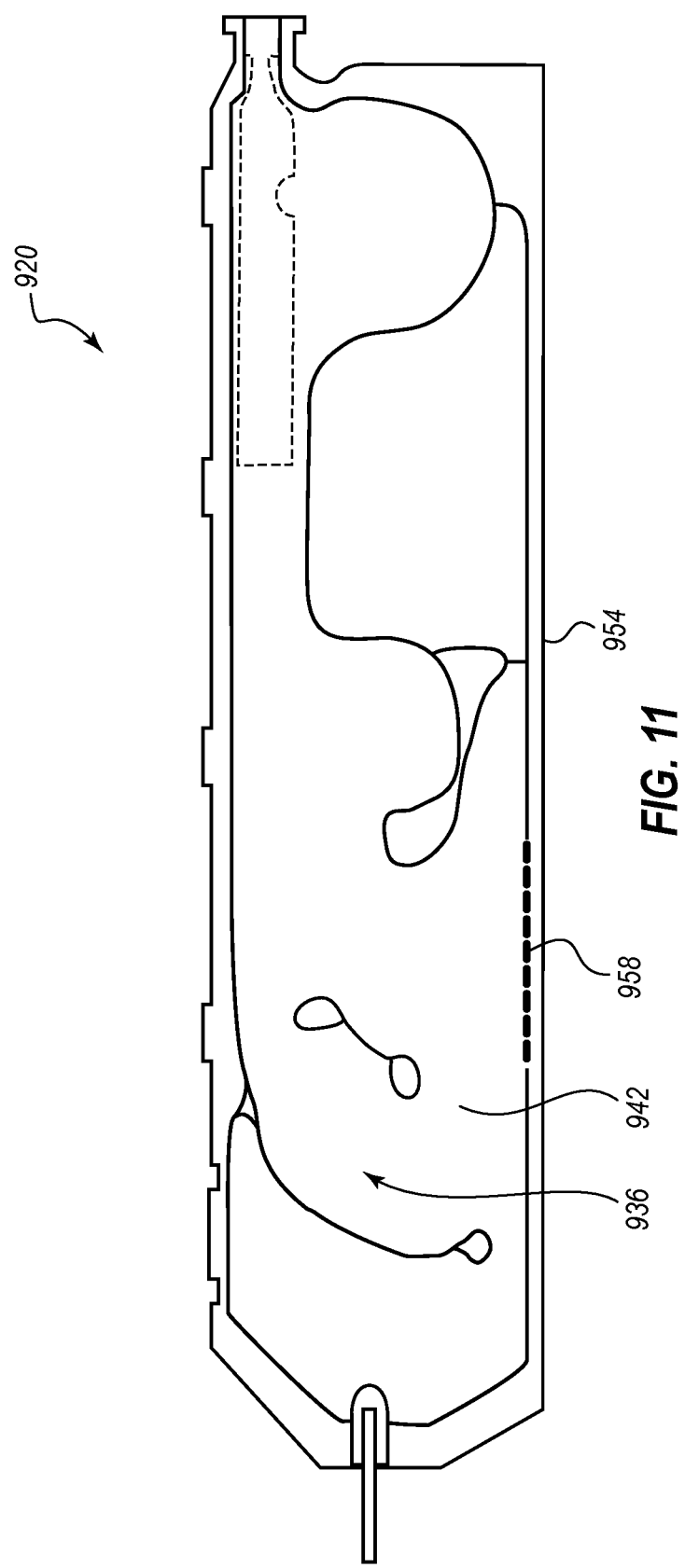
FIG. 11 is an elevation view of another embodiment of an inflatable curtain airbag that is compatible with the inflatable curtain airbag assembly of FIGS. 1A and 1B.

FIG. 11 depicts yet another embodiment of an inflatable curtain airbag 920, such as the inflatable curtain airbags 720, 820 discussed above. Embodiments of inflatable curtain airbag 920 are compatible with embodiments of the assembly 100 discussed above. In the illustrated embodiment, the venting panel 958 defines a boundary of one inflatable cushion segment 942 at or adjacent to the edge 954 of the inflatable curtain airbag 920. As illustrated, the venting panel 958 is in fluid communication with an exterior of the inflatable curtain airbag 920. In embodiments, the one inflatable cushion segment 942 may be configured to deflate more quickly than the remaining inflatable cushion segments 942 of the first chamber 936. This embodiment may permit the inflation gas to egress from the interior of the inflatable curtain airbag 920 to the exterior of the inflatable curtain airbag 920. The inflatable curtain airbag 920 does not comprise a second chamber, like the second chamber 838. As discussed above, a variety of different locations in the inflatable curtain airbag 920 are suitable for disposition of the vent panel 958.

Figure 12:
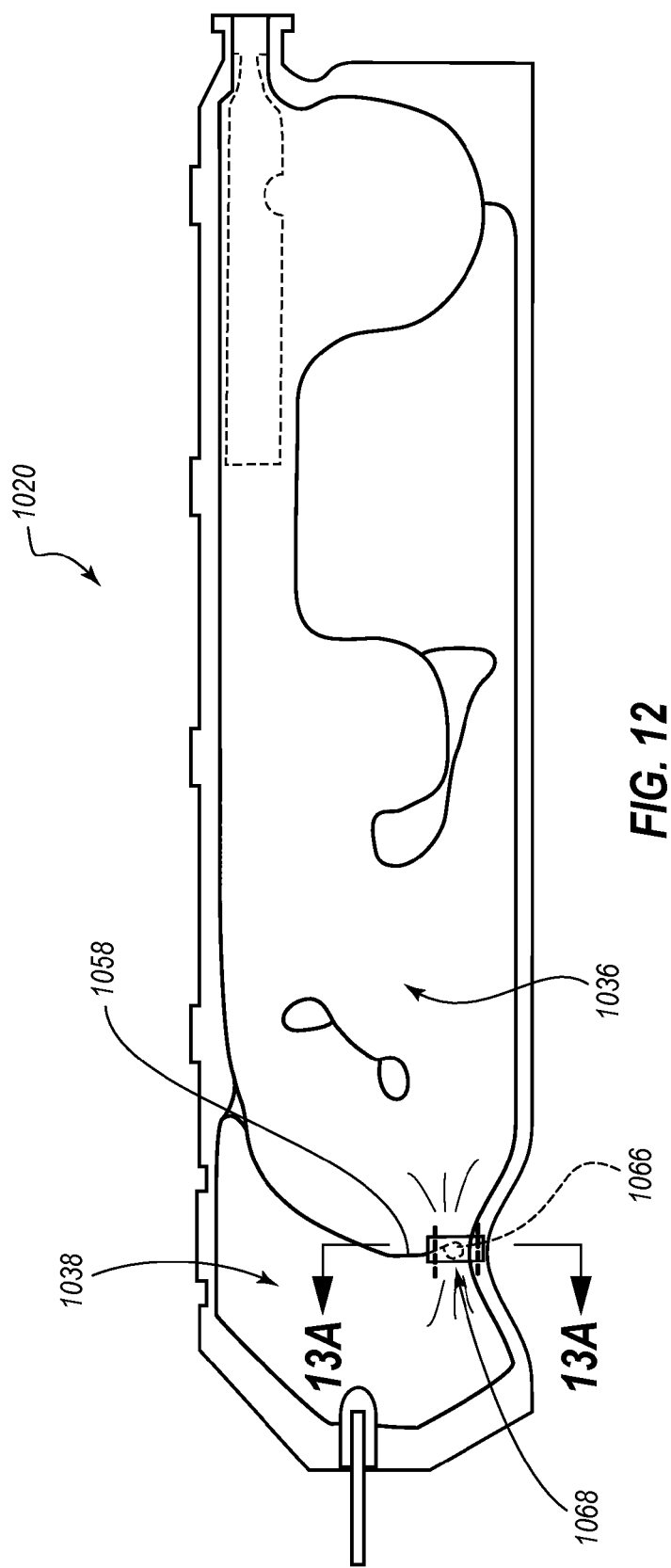
FIG. 12 is an elevation view of another embodiment of an inflatable curtain airbag that is compatible with the inflatable curtain airbag assembly of FIGS. 1A and 1B.

FIG. 12 shows another embodiment of an inflatable curtain airbag 1020 that can resemble the inflatable curtain airbags 720, 820, 920 described above in certain respects, and that can be compatible with the assembly 100. Whereas, the venting panels 758, 858, 958 in inflatable curtain airbags 720, 820, 920 comprise a plurality of slits 760, the venting panel 1058 in inflatable curtain airbag 1020 comprises an opening 1066. In other embodiments, venting panel 1058 may comprise more than one opening 1066. The opening 1066 may be retained in a closed configuration by at least one fold of a portion of the venting panel 1058. The fold may be secured in place by a fastening mechanism 1068. The fastening mechanism 1068 may comprise one or more of stitching, adhesives, clips, welding, and/or other suitable fasteners.

In embodiments, the opening 1066 can be configured to transition from a closed configuration to an open configuration when a volume of inflation gas in the first chamber 1036 reaches a predetermined value. In other embodiments, the opening 1066 may be configured to transition from a closed configuration to an open configuration when an internal pressure of the inflation gas in the first chamber 1036 reaches a predetermined value. For example, the opening 1066 can be configured to open when the pressure differential across the opening 1066 approaches, reaches, or surpasses a predetermined value. In one embodiment, the predetermined value may be reached when a vehicle occupant strikes a deployed inflatable curtain airbag 1020 in a collision event.

In other embodiments, the venting panel 1058 may delay the inflation gas from moving out of the first chamber 1036 into the second chamber 1038 when the opening 1066 is in a closed configuration, and the venting panel 1058 may permit the inflation gas to move more easily out of the first chamber 1036 into the second chamber 1038 when the opening 1066 transitions to an open configuration.

Figure 13A:
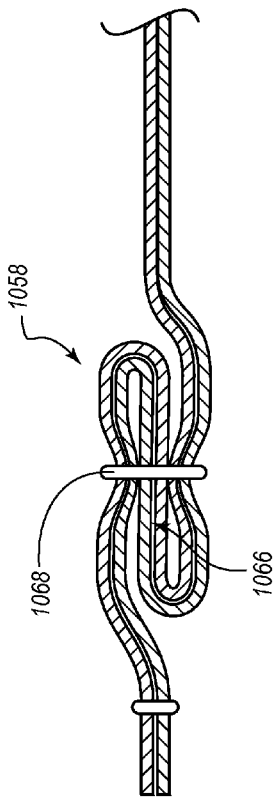
FIG. 13A is an enlarged cross-sectional view of the inflatable curtain airbag of FIG. 12 taken along line 13A-13A depicting an embodiment of a venting panel in a closed configuration.
Figure 13B:
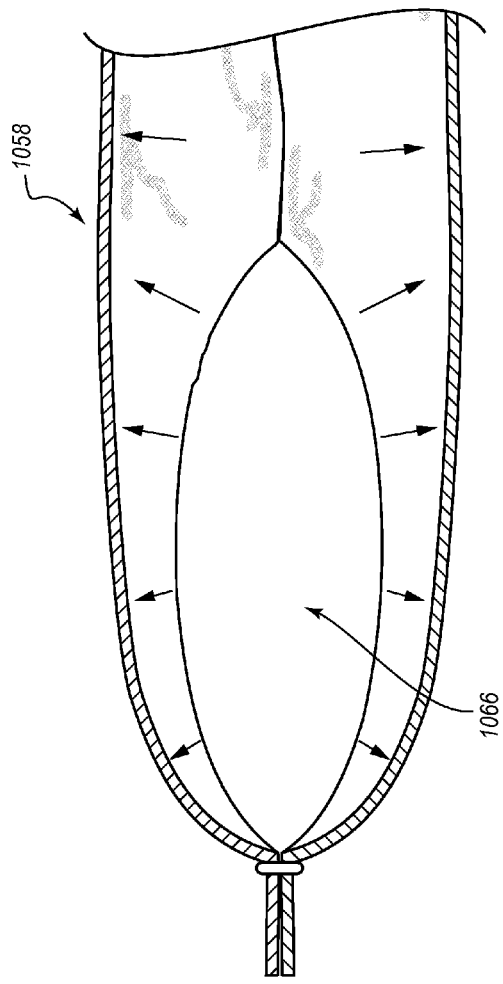
FIG. 13B is an enlarged cross-sectional view of the inflatable curtain airbag of FIG. 12 taken along line 13A-13A depicting the embodiment of the venting panel of FIG. 13A in an open configuration.

FIGS. 13A and 13B are enlarged cross-sectional views of the inflatable curtain airbag 1020 of FIG. 12 taken along line 13A-13A. FIG. 13A depicts an embodiment of a venting panel 1058 in a closed configuration, and FIG. 13B depicts the embodiment of the venting panel 1058 of FIG. 13A in an open configuration. In the embodiment illustrated in FIG. 13A, the fastening mechanism 1068 may comprise a tack stitch. In FIG. 13A the venting panel 1058 is depicted as being configured into a fold. As illustrated, the fold can be secured by a tack stitch, wherein the opening 1066 (see also FIG. 13B) is substantially sealed. As shown in FIG. 13B, the tack stitch may be configured to break when the volume of inflation gas in the first chamber 1036 reaches the predetermined value. In another embodiment, the tack stitch may be configured to break when the pressure of the inflation gas in the first chamber 1036 reaches the predetermined level. In embodiments, the tack stitch may be configured to permit the portion of the venting panel 1058 secured by the tack stitch to unfold and transition the venting panel 1058 from a closed configuration to an open configuration.

Figure 14A:
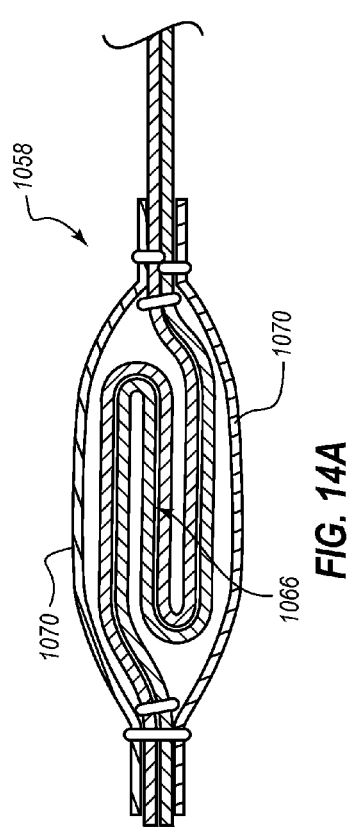
FIG. 14A is an enlarged cross-sectional view of the inflatable curtain airbag of FIG. 12 taken along line 13A-13A depicting another embodiment of a venting panel in a closed configuration.
Figure 14B:
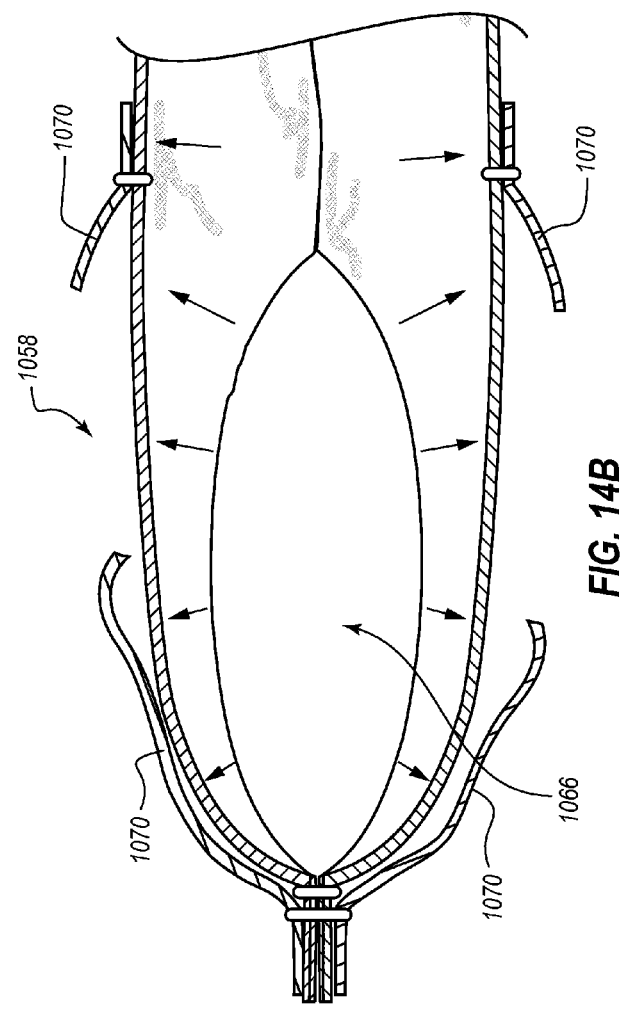
FIG. 14B is an enlarged cross-sectional view of the inflatable curtain airbag of FIG. 12 taken along line 13A-13A depicting the embodiment of the venting panel of FIG. 14A in an open configuration.

FIGS. 14A and 14B are enlarged cross-sectional views of the inflatable curtain airbag 1020 of FIG. 12 taken along line 13A-13A depicting another embodiment of a venting panel 1058. FIG. 14A depicts the venting panel 1058 in a closed configuration and FIG. 14B depicts the embodiment of the venting panel 1058 of FIG. 8A in an open configuration. As depicted in FIGS. 14A and 14B, the fastening mechanism may comprise one or more straps 1070. In some embodiments, the straps 1070 may comprise a tear seam wherein the tear seam is configured to break when the volume of inflation gas in the first chamber 1036 reaches a predetermined value. In another embodiment, the straps 1070 may be configured to break when the pressure of the inflation gas in the inflatable curtain airbag 1020 reaches a predetermined level. In embodiments, the straps 1070 may be configured to permit the portion of the venting panel 1058 secured by the straps 1070 to unfold and transition the venting panel 1058 from a closed configuration to an open configuration. The venting panel 1058 may be secured in a closed configuration by one or more straps 1070 comprising tear seams. For example, there may be a first strap 1070 coupled to a first side of the venting panel 1058 and a second strap 1070 coupled to the second side of the venting panel 1058. The first and second straps 1070 may be configured to break when the predetermined value is reached and thus aid in transitioning the venting panel 1058 from a closed configuration to an open configuration. In some embodiments the strap 1070 may be coupled to the venting panel 1058 by one or more of stitching, adhesives, clips, and/or other suitable fasteners. In one example, the tear seam of the strap 1070 may be configured to break when a vehicle occupant strikes a deployed inflatable curtain airbag 1020 in a collision and/or rollover event. When the tear seam breaks the opening 1066 may be configured to transition from a closed configuration to an open configuration.

In embodiments, a first portion of the venting panel 1058 may be folded over a second portion of the venting panel 1058 to substantially seal the one or more openings 1066. In other embodiments, a first portion of the venting panel 1058 may be formed into a single fold, a second portion of the venting panel 1058 may also be formed into both a first fold and a second fold, and the single fold may be disposed between the first and second folds to substantially seal the one or more openings 1066. The folding configurations described above may further be secured by a tack stitch or other suitable fastener.

Referring again to FIG. 12, in some instances, the one or more venting panels 1058 can be configured to delay the inflation gas present in the one or more inflatable cushion segments 1042 from moving from the inflatable cushion segments 1042 to the second chamber 1038 when the one or more openings 1066 are in a closed configuration. In other instances, the venting panels 1058 can be configured to permit the inflation gas present in the inflatable cushion segments 1042 to move more easily from the inflatable cushion segments 1042 into the second chamber 1038 when the openings 1066 are in an open configuration.

Figure 15:
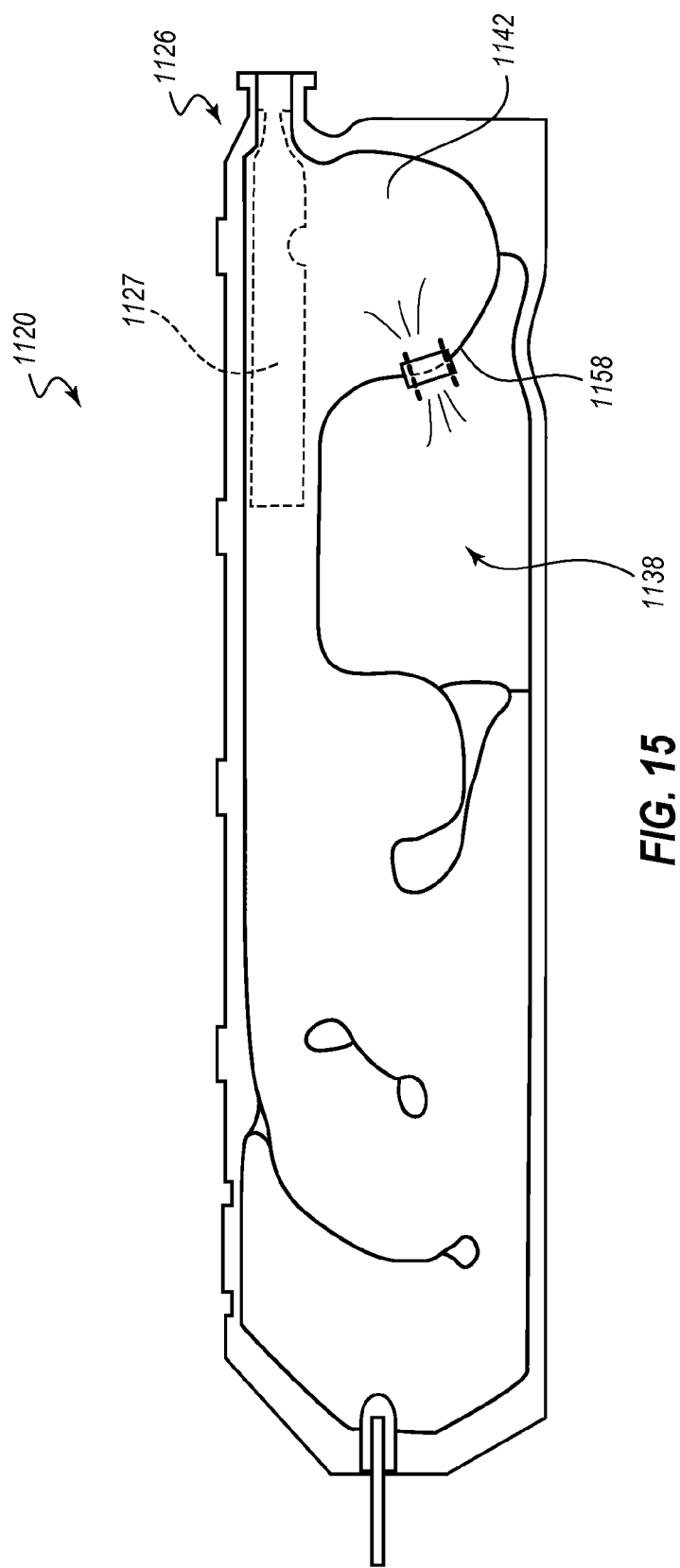
FIG. 15 is an elevation view of another embodiment of an inflatable curtain airbag that is compatible with the inflatable curtain airbag assembly of FIGS. 1A and 1B.

FIG. 15 depicts another embodiment of an inflatable curtain airbag 1120 such as the inflatable curtain airbag 1020 discussed above. Embodiments of the inflatable curtain airbag 1120 are compatible with embodiments of the assembly 100 discussed above. A first inflatable cushion segment 1142 of the inflatable curtain airbag 1120 is positioned proximally to the throat portion 1126 and below the throat liner 1127. A second chamber 1138 is positioned distally to the first inflatable cushion segment 1142. The venting panel 1158 defines a boundary between the first inflatable cushion segment 1142 and the second chamber 1138. In other embodiments, venting panels 1158 may be positioned in any suitable location in the inflatable curtain airbag 1120. Placement of the second chamber 1138 and/or the venting panel 1158 can be made to impart desirable cushioning and venting characteristics to various portions of the inflatable curtain airbag 1120.

Figure 16:
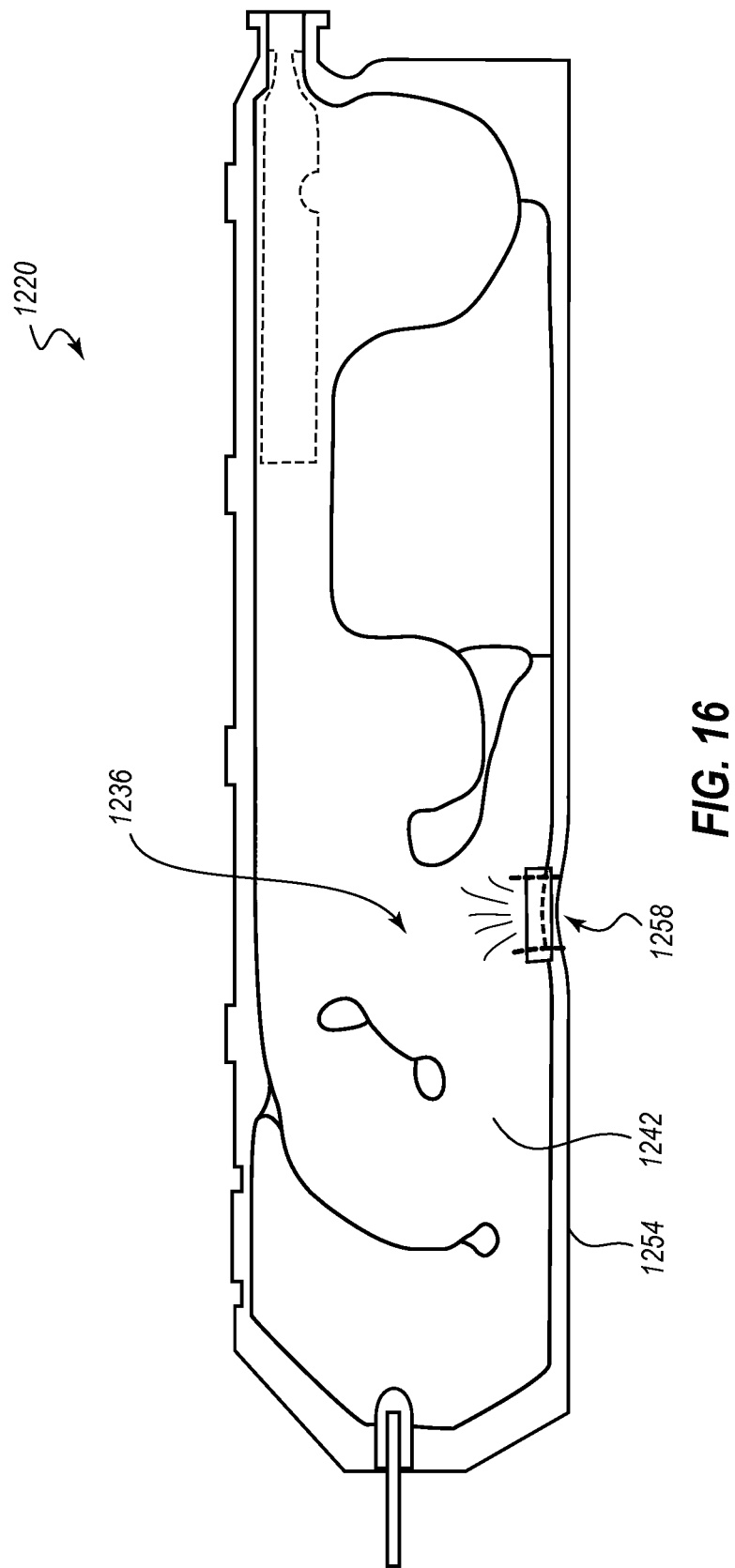
FIG. 16 is an elevation view of another embodiment of an inflatable curtain airbag that is compatible with the inflatable curtain airbag assembly of FIGS. 1A and 1B.

FIG. 16 depicts another embodiment of an inflatable curtain airbag 1220 such as the inflatable curtain airbags 1020, 1120 discussed above. Embodiments of the inflatable curtain airbag 1220 are compatible with embodiments of the assembly 100 discussed above. In the illustrated embodiment, the venting panel 1258 defines a boundary of one inflatable cushion segment 1242 at or adjacent to the edge 1254 of the inflatable curtain airbag 1220. As illustrated, the venting panel 1258 is in fluid communication with an exterior of the inflatable curtain airbag 1220. In embodiments, the one inflatable cushion segment 1242 may be configured to deflate more quickly than the remaining inflatable cushion segments 1242 of the first chamber 1236. This embodiment may permit the inflation gas to egress from the interior of the inflatable curtain airbag 1220 to the exterior of the inflatable curtain airbag 1220. The inflatable curtain airbag 1220 does not comprise a second chamber, like the second chamber 1138. As discussed above, a variety of different locations in the inflatable curtain airbag 1220 are suitable for disposition of the vent panel 1258.

Figure 17A:
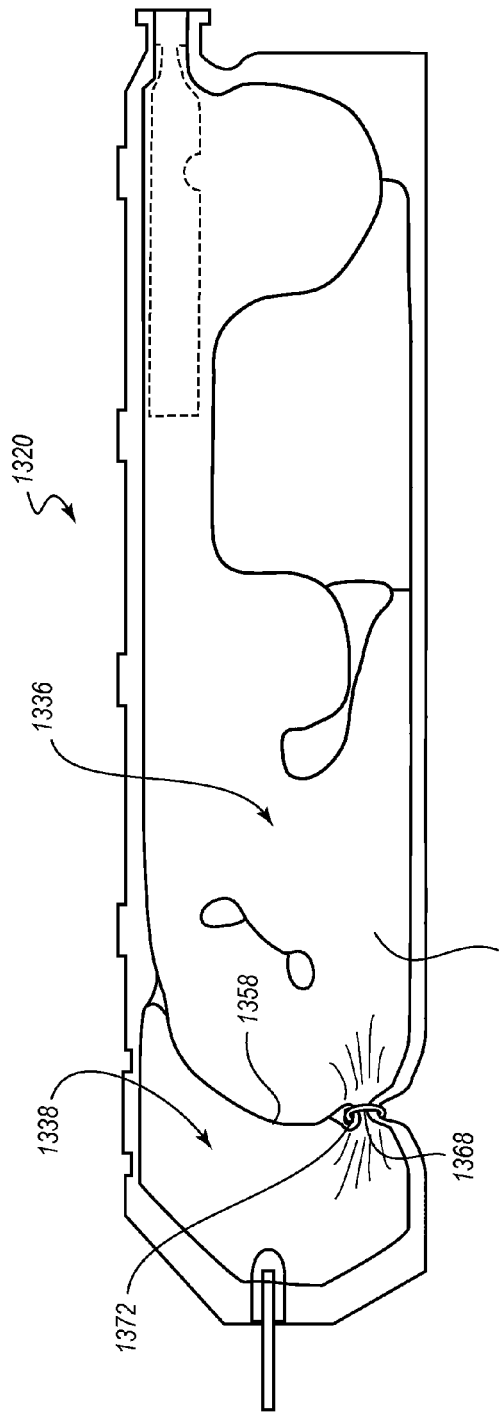
FIG. 17A is an elevation view of another embodiment of an inflatable curtain airbag that is compatible with the inflatable curtain airbag assembly of FIGS. 1A and 1B shown in a coupled configuration.
Figure 17B:
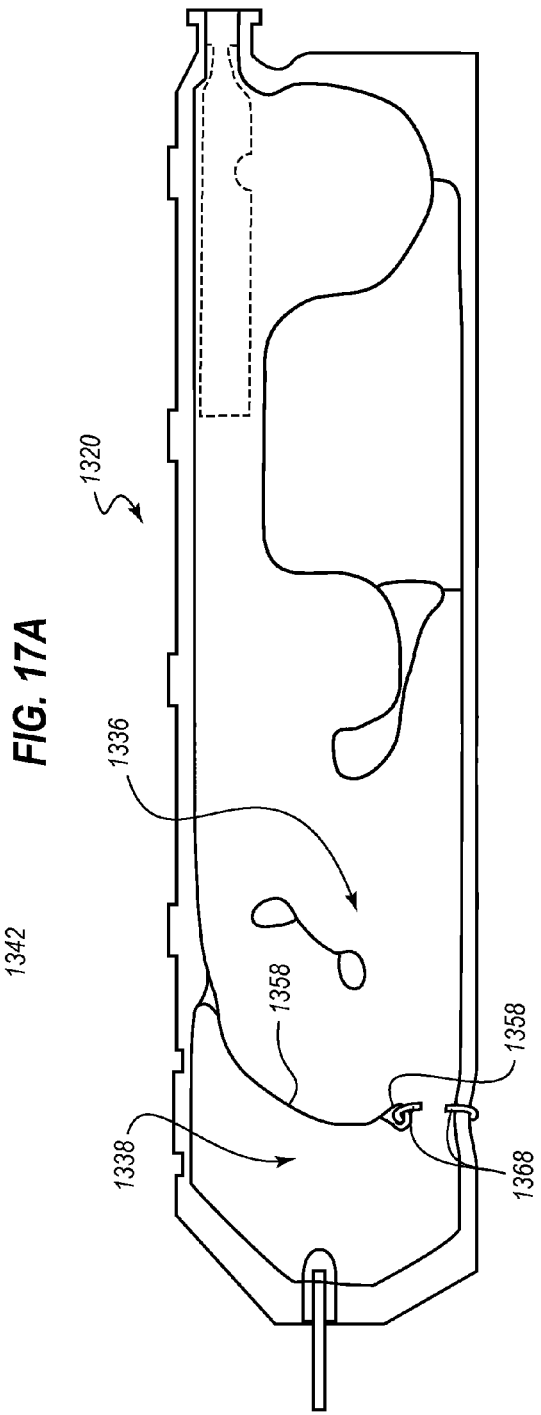
FIG. 17B is an elevation view of another embodiment of an inflatable curtain airbag that is compatible with the inflatable curtain airbag assembly of FIGS. 1A and 1B shown in an uncoupled configuration.

FIGS. 17A and 17B show another embodiment of an inflatable curtain airbag 1320 that can resemble the inflatable curtain airbags 720, 1020 described above in certain respects, and that can be compatible with the assembly 100. The inflatable curtain airbag 1320 of the illustrated embodiment includes a venting panel 1358 that defines a boundary between the first chamber 1336 and the second chamber 1338. The venting panel 1358 comprises a loop 1372 at a proximal end of the venting panel 1358. In embodiments, the loop 1372 can be configured to releasably couple the venting panel 1358 to an interior surface of the inflatable curtain airbag 1320. Additionally, the loop 1372 may be configured to transition from a coupled configuration (see FIG. 17A) to an uncoupled configuration (see FIG. 17B) when a volume of inflation gas in the first chamber 1336 reaches a predetermined value.

In some embodiments, the venting panel 1358 may delay the inflation gas from moving out of the first chamber 1336 into the second chamber 1338 when the loop 1372 is in a coupled configuration. When the loop 1372 is in an uncoupled configuration, the venting panel 1358 may be configured to permit the inflation gas to move more easily out of the first chamber 1336 and into the second chamber 1338.

The distal end of the venting panel 1358 at or adjacent to the loop 1372 may retract away from the interior surface of the inflatable curtain airbag 1320 to form a vent or opening in the interior of the inflatable curtain airbag 1320 for the passage of inflation gas from the first chamber 1336 to the second chamber 1338. The loop 1372 may be releasably coupled to the interior surface of the inflatable curtain airbag 1320 by a fastener 1368. In embodiments the fastener 1368 can be selected from at least one of adhesives, hook-and-loop fasteners, tack stitching, tapes, and/or straps comprising tear seams. As described above, the venting panel 1358 may be configured to optimize the relative internal pressures of the first and second chambers 1336, 1338 in a deployed inflatable curtain airbag 1320.

In embodiments, the inflatable cushion airbags 720, 820, 920, 1020, 1120, 1220, 1320 may be modified to be compatible with embodiments of the assembly 400 discussed above.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:
1. An inflatable curtain airbag assembly comprising:
   an inflatable curtain airbag having a longitudinal orientation, the inflatable curtain airbag comprising:
   a throat portion in fluid communication with an inflator;
   a throat liner in fluid communication with and disposed within at least a portion of the throat portion, and wherein the throat liner extends in the longitudinal orientation of the inflatable curtain airbag away from the throat portion;

a first chamber in fluid communication with the throat liner comprising a plurality of inflatable cushion segments; and one or more venting panels defining a boundary of one or more of the inflatable cushion segments comprising a plurality of slits;

wherein the plurality of slits are configured to transition from a closed configuration to an open configuration when a volume of inflation gas in the first chamber reaches a predetermined value.

2. The inflatable curtain airbag assembly of claim 1, wherein the one or more venting panels delay the inflation gas from moving out of the first chamber when the plurality of slits are in a closed configuration, and wherein the one or more venting panels permit the inflation gas to move more easily out of the first chamber when the plurality of slits transition to an open configuration.

3. The inflatable curtain airbag assembly of claim 1, wherein the inflatable curtain airbag comprises one venting panel wherein the venting panel defines the boundary between a first inflatable cushion segment and an exterior of the inflatable curtain airbag, and wherein the first inflatable cushion segment is configured to deflate more quickly than the remaining inflatable cushion segments of the first chamber.

4. The inflatable curtain airbag assembly of claim 1, wherein the predetermined value is set to be reached when an occupant strikes at least one of the one or more inflatable cushion segments in a collision.

5. The inflatable curtain airbag assembly of claim 1, wherein the inflatable curtain airbag further comprises a second chamber wherein the one or more venting panels define the boundary between the second chamber and a first inflatable cushion segment, and wherein the first inflatable cushion segment is configured to deflate more quickly than any remaining inflatable cushion segments of the first chamber.

6. The inflatable curtain airbag assembly of claim 5, wherein a volume of the first chamber is greater than a volume of the second chamber.

\* \* \* \* \*